United States Patent [19]

Soderberg

[11] 4,393,454

[45] Jul. 12, 1983

[54] ELECTRONIC PARCEL REGISTER

[75] Inventor: John H. Soderberg, Monroe, N.Y.

[73] Assignee: Pitney Bowes Inc., Stamford, Conn.

[21] Appl. No.: 224,875

[22] Filed: Jan. 14, 1981

[51] Int. Cl.³ .............................................. G06K 15/00

[52] U.S. Cl. .................................... 364/518; 235/432; 364/466

[58] Field of Search ........................ 364/518, 466, 464; 235/432, 433; 177/25, 50

[56] References Cited

U.S. PATENT DOCUMENTS

| | | | |
|---|---|---|---|
| 3,635,297 | 1/1972 | Salava | 364/466 X |
| 3,989,929 | 11/1976 | Treiber | 235/432 |
| 4,024,380 | 5/1977 | Gunn | 177/5 X |
| 4,051,913 | 10/1977 | Gudea | 364/466 X |
| 4,139,892 | 2/1979 | Gudea et al. | 364/466 X |
| 4,229,794 | 10/1980 | Foster | 235/432 X |
| 4,280,179 | 7/1981 | Jones, Jr. | 364/466 X |
| 4,286,325 | 8/1981 | Dlugos et al. | 364/466 |

FOREIGN PATENT DOCUMENTS 19515 11/1980 European Pat. Off. ............ 364/466

*Primary Examiner*—Edward J. Wise
*Attorney, Agent, or Firm*—Peter Vrahotes; William D. Soltow, Jr.; Albert W. Scribner

[57] ABSTRACT

An electronic parcel register which prints postage on a tape and includes postage accounting circuitry for accounting for the printed postage. The printing section has a first set of printing wheels that may be selectively positioned to print a value on the tape and a second set of printing wheels that are incrementable for printing consecutive numbers on successive tapes. The system includes a microprocessor for controlling the accounting circuitry, for selecting the position of the first set of wheels for the printing of the postage value on a first tape, and for incrementing the second set of print wheels after each printing to obtain consecutive parcel identification numbers. The system also includes circuitry for selectively inhibiting the incrementing of the second set of wheels upon printing of a tape whereby the same parcel identification number may be presented upon successive tapes.

19 Claims, 44 Drawing Figures

ELECTRONIC PARCEL REGISTER

BACKGROUND OF THE INVENTION

This invention relates to electronic parcel registers, hereinafter referred to as registers, and is directed to a register of the type having a keyboard for the entry of information to be printed, a display for displaying such information, an electronic accounting unit, and a printing mechanism. In a register, provision must be made for the printing of a postage tape as well as a COD tape, both of which are attached to a parcel to be shipped by a parcel service company. Although the word postage is generally defined as a fee for postal services, the word "postage" as used throughout this specification includes fees charged by private carriers for the delivery of packages or parcel. The register, which serves as an input unit, is secured to and cooperates with a base to print and disperse tapes which are to be affixed to a parcel. The COD tapes indicate that the parcel is to be sent COD and shows the amount that is charged for a parcel having been sent COD. Obviously, the postage tape is stamped with the amount that is required to ship a parcel the required distance in accordance with the weight of the parcel. Such tapes are also stamped with a parcel identification number (PIN) to indicate the number of parcels for which tapes have been printed. Use of such PIN provides a means of security so as to detect unauthorized use of the register. When both postage tapes and COD tapes are to be applied to a parcel, it is required that the same PIN be printed on both tapes otherwise there would be no integrity with regard to the system for accounting for the number of parcels that are stamped by the register. The amount printed on the COD tape is usually a fixed amount but it has been necessary in prior registers to input the COD amount on each occasion. It obviously would be desirable to print a COD tape with a fixed amount without need of constant inputting, but being able to change the COD amount when required.

In prior devices of the general category, including electronic postal meter operation, it has been found desirable to employ one or more microprocessors to control various functions and operations. For security reasons, all data relating to accounting should be maintained separately from other data relating to nonsecure information. By separate maintenance of secure data it is therefore possible to improve security while employing concepts of distributed processing by the use of multiple processors.

The use of multiple processing in a secure environment places stringent requirements on error rate in interprocessor communications, which requirements must be satisfied in order to have successful operation. It is further desired to provide a system of this type which can easily subrogate its control authority to an external unit, thereby allowing substantially one hundred percent control of register function to be transferred to an external device, without any change in system hardware. This subrogation also allows the external device to control or change register configurations internal to the register that are not normally allowed in normal register operation.

SUMMARY OF THE INVENTION

In a preferred embodiment of the invention, the register is provided with a keyboard that may be used to initiate printing of postage upon a tape which is to be affixed to a parcel as well as the selective printing of a COD charge upon a separate tape. The register is so fashioned so that the PIN mechanism may be inhibited by appropriate selection of keys on the keyboard so that both the postage tape and the COD tape may have the same PIN. Additionally, the register is so fashioned that it may be set to print a standard COD charge without need of inputting the standard amount on each use, but means is provided for selectively changing the COD amount to be printed without having effect on the standard setting. Three modules are included in the register which, although mechanically connected together, are each provided with a CPU, and the three modules are each provided with a crystal controlled clock. Accordingly, the frequencies of the clocks of the different units need not be identical, and the communication between the modules is by way of serial messages that are asynchronously transmitted and received. The format of the messages, and the timing of the bits in different modules is precisely set, however, to insure that messages may be sent and received without the necessity for synchronizing the differnt modules. In addition, upon receipt of the first bits of a message from a transmitting module, the received bits are retransmitted by the receiver back to the transmitter for comparison, to enable the transmitter to send a "no error" within a minimum period of time following the complete message transmission, verifying the correctness of the message as sent and received. Although the register is shown and described using a CPU for each module, it will be appreciated that a single CPU may be used for the entire register without departing from the invention.

All control and data signals utilize the same pair of conductors in each direction with precisely defined timing for control.

For providing external control, the control flow is in one direction and information flow in the other direction.

All control of the register and all information inside the meter can be controlled by connection through an interface connector. All functions performed by the register are controllable electrically from a remote location, except purely local manual functions such as power on and date change. This results from the communication capability of the data units. The organization of the three modules results from a flow of commands or control of data from the control module to the accounting module and then to the printer module, such as for example, a new value of postage anmd where it is to be set. The flow of information also takes place in the opposite direction, for example, a current register value or the like. Within this concept, connection of an external device, such as an electronic scale to the control module, can operate to place commands or data control instructions information into the register.

The interface operation allows the external device to take control of the register, thereby disabling the keyboard. The external device can communicate messages with the display, thereby eliminating the need for a keyboard and display in the external device. One specific advantage of the foregoing arrangement is that the control unit may be physically replaced by the attached external operating device, without any changes in the accounting module or the printing module, either in hardware or software.

DETAILED DESCRIPTION OF THE PREFERRED EMBODIMENT

Figure 1:
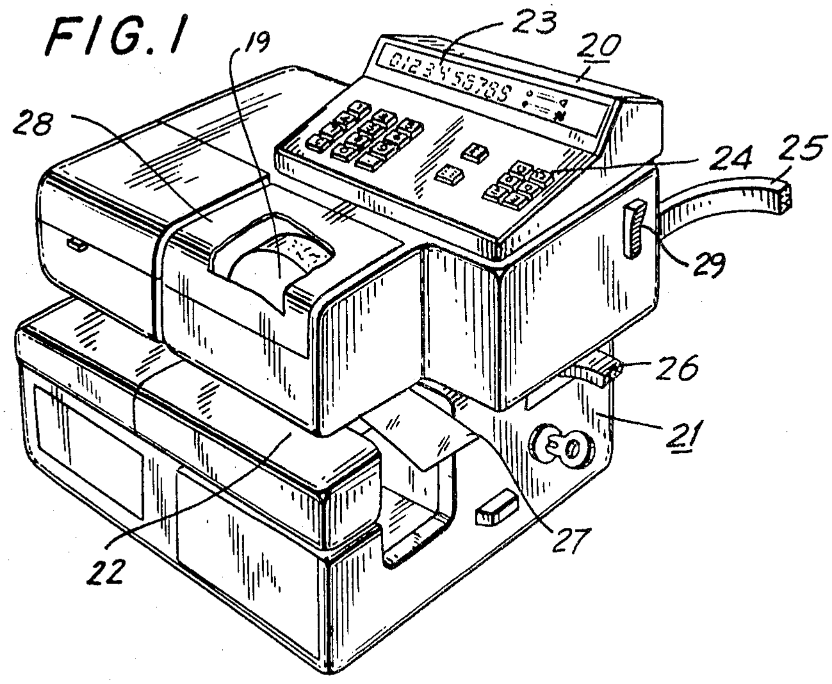
FIG. 1 is a perspective view of a register and base which may incorporate the system of the present invention.

Referring now to the drawings, and more in particular to FIG. 1, therein is illustrated a parcel electronic register 20, hereinafter referred to as register, affixed to a base 21. The base 21 houses a roll of tape 27, a portion only of the tape shown in FIG. 1 after being printed upon. The register 20 includes a print drum 19 that will print the postage value, a pin identification number and the date on the tape 27. A slot 22 is provided between the register 20 and the base 21 at the forward edge thereof, for receiving the tape 27 for printing and for discharging the tape therefrom. The base contains a knife (not shown) which cuts the tape 27 into individual pieces and the tape has self adhering glue on one side thereof so that the printed and cut tape may be applied to a parcel as is well known in the art. The register 20 is provided with a display panel 23, preferably an electronic display device, as well as a keyboard or control panel 24 which may be organized in a manner to be disclosed hereinafter. The register 20 and base 21 may be energized by way of an electrical cable 25. The register 20 includes a door 28 that provides access for the operator to the data setting mechanism (not shown) of the register and a switch 29 that turns on the register in combination with the cable 25.

The register 20 illustrated in FIG. 1 may be of the type that is removable from the base 21 through use of a handle 26, and the base 21 may be a Model 5400 series mailing machine or a Model 5600 series mailing machine, all of which are available fom Pitney Bowes, Inc., Stamford, Conn. Such bases 21 include a conveying means for the tape roll 27 contained therein. The separability of the register 20 and base 21 renders the electronic register compatible with conventional driving units, simplifies servicing of the device and simplifies transport of the register.

Figure 2:
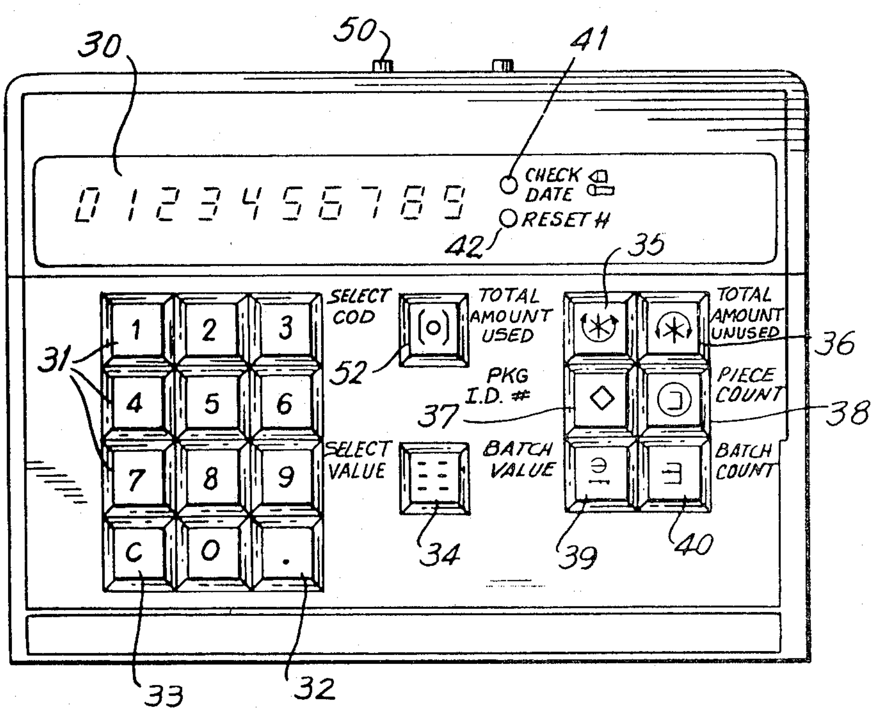
FIG. 2 is a plane view of the display panel and keyboard of the register shown in FIG. 1.

The display panel 23 for the register 20 is more clearly illustrated in FIG. 2, wherein it is seen that the register is provided with a display 30, for example, a conventional multiplexed seven-segment LED or LCD display. In addition, the keyboard 24 is provided with numeric setting keys 31 and a decimal key 32, operative therewith, for setting the register to print a desired amount of value on the tape 23, the amount normally being displayed on the numeric display 30. A clear key 33 may also be provided to clear the display amount in the event, for example, of an erroneous entry. When the displayed amount has been set to the desired value, depression of a select value key 34 effects setting of the print wheels for setting parcel value and the printing of a tape 27 with the value entered through the key 31.

The keyboard 24 may further be provided with a series of keys enabling the selective display of other values on the display 30. For example, depression of a key 35 may enable the display of the contents of an ascending register, i.e., the total amount used by the register 20, and depression of another key 36 may enable display of the contents of a descending register in the register, i.e., the total amount for which the register is still charged. Further keys may enable display in conventional manner of other specific specialized values as parcel identification number (PIN) 37, piece count 38, batch value 39, and batch count 40. The batch value and batch count registers can be cleared by simultaneous depression of either batch value key 39 or batch count key 40, respectively, and the clear key 33.

The display panel 23 preferably is provided with an LED 41 which will be lit upon each application of power to the register 20, as is conventionally done at the beginning of a day, to indicate that the dater has not been set or that the dater door 28 is open. A further LED display 42 may be provided and interconnected to be lit if the base 21 is in the wrong state to reset the trip mechanism in the base before operation is to commence.

The register 20 may be provided with a service switch 50 at the rear thereof for the convenience of field service personnel enabling use of the keys of the meter for different functions. Upon operation of the switch 50, the keys 35–40 may thereby allow the display of additional values such as the unlock value, the COD value, the register number, diagnostic status, and the maximum settable amount.

The service switch 50 may be an unsecured switch in the register 20, since the display of the additional values rendered possible by the use of this switch does not affect the security of the register, and merely enables the display of further values. The fact that it is these values that are being displayed may be shown by distinctive underlining of the display, if desired. The operation of the service switch 50 partially disables the select value key 34. It will then not be possible to set a new value in the register 20 when it is in the "service" mode and an interposer (shown in FIG. 9) will act to block operation of the register in the service mode; however, the select value key 34 may still be used to cause the display of the currently set value.

When the register 20 is in the service mode, i.e., with the switch 50 operated, the entry into the register of a new value and depression of the select value key 34 will enable the resetting of the unlock value. Depression of the select COD key 52 will enable the resetting of the COD value. The "unlock" value is a determined value, for example, three dollars, which prohibits the operator from accidentally printing excessive amounts. For this purpose, all values above the unlock value require an additional step on the part of the operator, such as an additional depression of the select value key 34. The display may be provided with a distinctive indication, for example, one horizontal bar, to indicate that the printing wheels have been set but the unlock step, i.e., the additional depression of the set postage key 34, has not been effected. The completion of the unlock step would be indicated by the display, for example, of three horizontal bars to indicate that the meter is enabled to be tripped, to print parcel values.

The "maximum settable" amount, of course, cannot be exceeded in the setting of any parcel value.

Figure 2A:
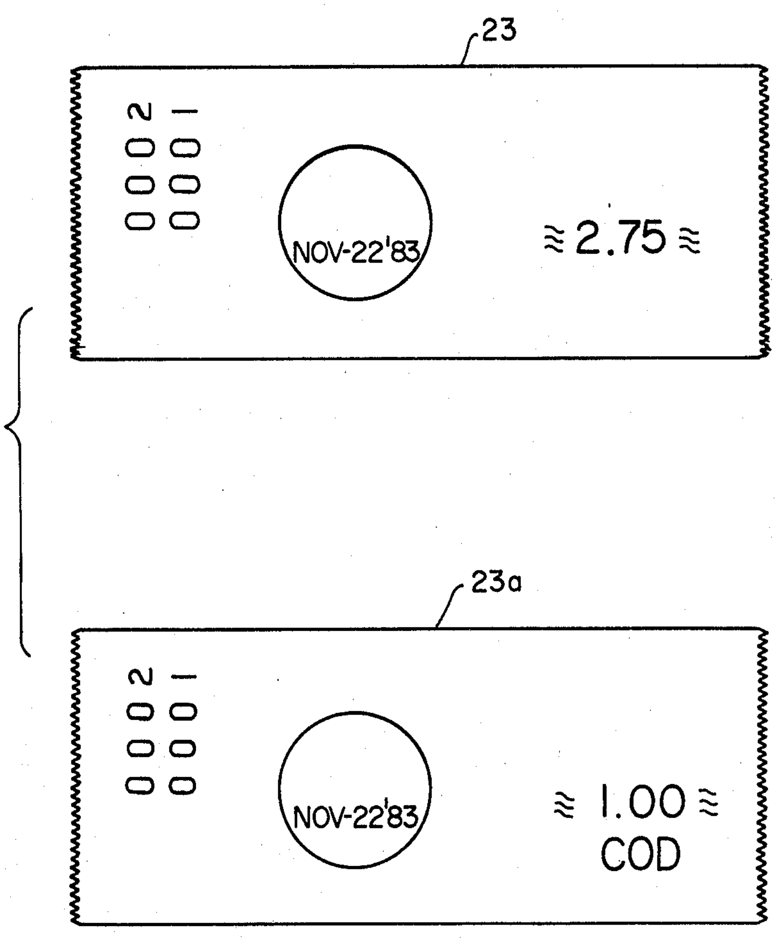
FIG. 2*a* is a plan view of two tapes that have been printed in accordance with the instant invention.

There are times when parcels are to be sent COD. For this purpose, the register 20 is provided with a select COD key 52, allowing either a fixed COD amount or a variation of the fixed COD amount to be printed on a tape 27. The standard rate for sending a parcel COD is a fixed sum such as one dollar. When a parcel is to be sent at the fixed COD rate, the operator will initially print the parcel value upon a tape 27 through use of the setting keys 31 and the select value key 34, as previously described, and then will print a second tape 23*a* with the COD value. If the fixed COD value is to be printed, the operator will depress the select COD key 52 immediately after depressing the select value key 34 to print the parcel value on the tape 23. When a COD value other than the fixed value is to be charged, the operator will input the variable value through use of the select keys 31 and then depress the select COD key 52. The depressing of the select COD key 52 will cause the PIN counter to be inhibited so that the COD tape 27*a* will have the same PIN as the postage value tape 27 as seen in FIG. 2*a*.

Figure 3:
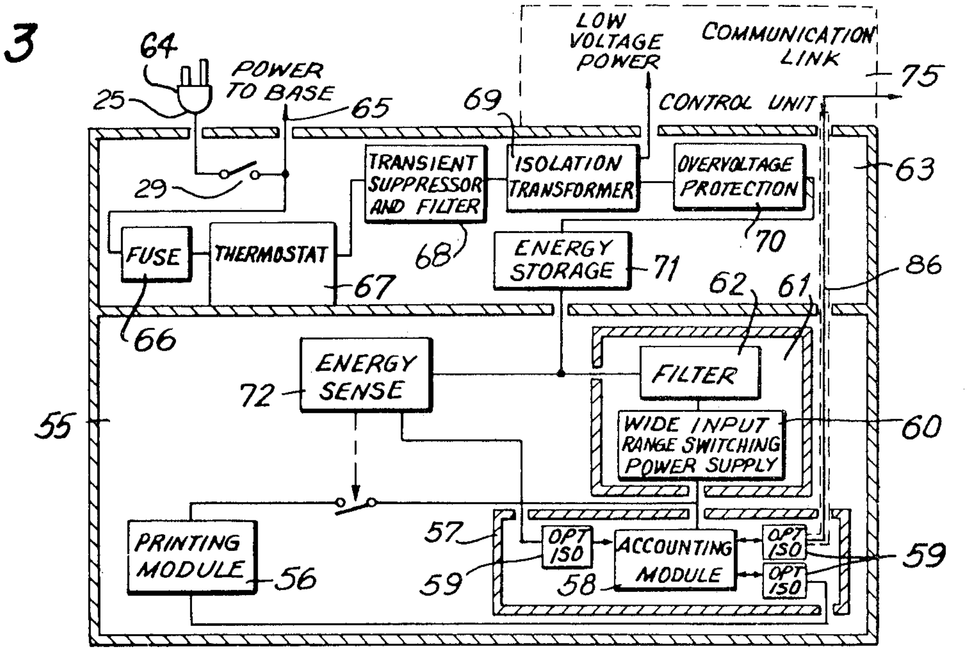
FIG. 3 is a block diagram showing the orientation of the components of the register unit shown in FIG. 1.

The internal components of the register 20 are preferably oriented as illustrated in FIG. 3, and include a first compartment 55 that is physically secure, i.e., as secure as is reasonably possible to prevent unauthorized tampering with internal components thereof. While it may not be possible to provide 100% security in this regard, physical evidence of tampering will be evident in any event before entry can be gained. The compartment 55 encloses the printing module 56, which may include a mechanical printing assembly, and if desired, a separate microcomputer for controlling this module.

The compartment 55 also encloses a further compartment 57, which is preferably electromagnetically shielded, and contains an accounting module 58. The accounting module 58 is connected to external devices, i.e., external of the compartment 57, only by optical or similar isolation couplers 59 as disclosed in U.S. patent application Ser. No. 63,369 filed Aug. 3, 1979, in order to avoid damage thereto, either accidentally or intentionally resulting from introduction of noise, for example, excess voltages, into the accounting module. A power supply 60 is contained in a separate compartment 61 that is also within the secure compartment 55. The power supply 60 is coupled to the accounting module 58 and is energized by way of a filter 62 within the compartment 61 to insure the absence of any voltage variations that would adversely affect the accounting module. The power input to the compartment 61 is directed into the compartment 55 from a power system in a further compartment 63 that is preferably defined by the outer secure housing of the compartment 55. Thus, while it is not absolutely necessary for all the elements within the compartment 63 to be physically secure, this feature is preferred.

The power from a main plug 64 is fed through the cable 25 and switch 29 into the compartment 63, from where it may be fed by way of a suitable connection 65 to power the meter base 21. The power for the register 20 may be fused in the compartment 63, by means of a fuse 66, applied from the fuse to a thermostat 67 and thence to a transient suppressor and filter 68. The thermostat 67 inhibits application of voltage to the balance of the compartment 63 in the event of excess temperatures. Further protection for the system is provided by means of an isolation transformer 69 and an over voltage cut-out device 70. The power for the register 20 is finally applied to an energy storage device 71, such as a large valued capacitor 71, the capacitor 71 having adequate energy storage to enable the self-protection features of the register 20 to operate, such as transfer of data that may be in progress in the modules to a non-volatile memory, in the event of a power failure. The reduction of voltage resulting from a power failure may be sensed by a sensor 72 in the secure housing 55 which has one output directed to the accounting module 58 for signaling the necessity of a mode change and another output (which can be mechanical) for inhibiting further printing module 56 functions.

A further output of the isolation transformer 69 may be fed externally of the register 20 to a control unit 75, and one of the isolated outputs 86 of the accounting module 58 may be directed through the chamber 63 also to the control unit. The control unit 75 may thus constitute a keyboard control unit such as illustrated in FIG. 2, including the key switches, displays, etc., necessary for local operation of the device. It is thus apparent that the system of FIG. 3 orients the elements of the register 20 so that elements which are less critical to the security of the parcel register system are provided with successively lower levels of physical and electrical security.

Figure 4:
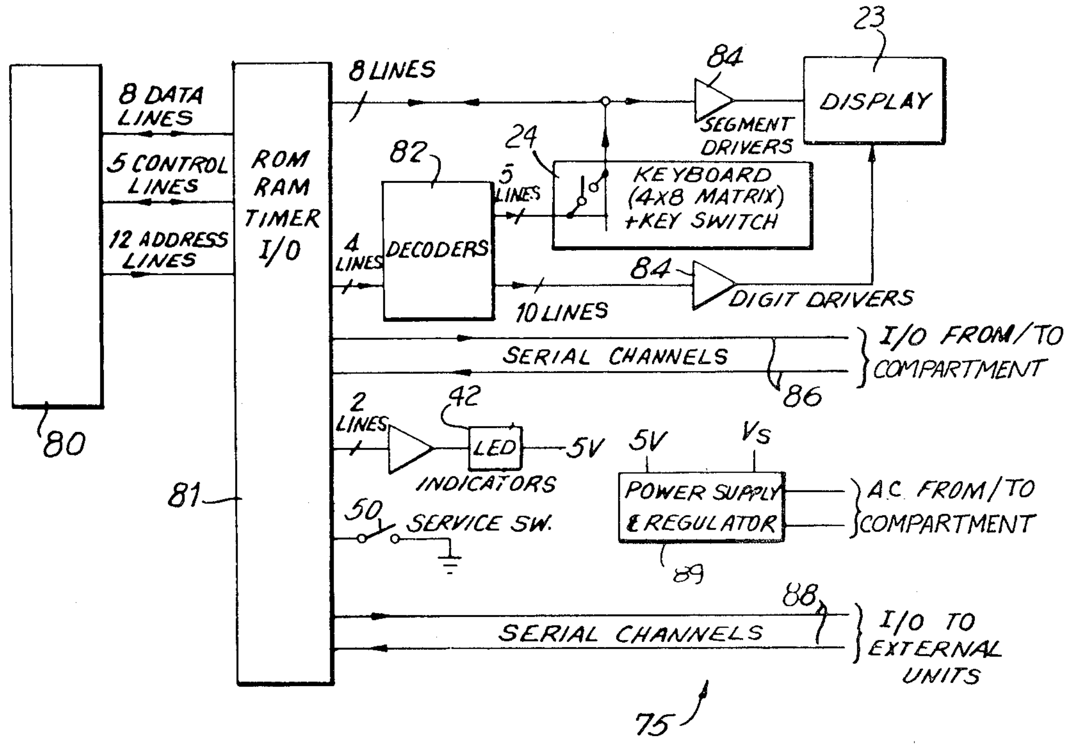
FIG. 4 is a diagram of the circuitry of a control unit that may be used for the register of FIG. 1 in accordance with the invention.

The preferred embodiment of the control unit 75 is illustrated in FIG. 4. This control unit 75, for versatility in design, as well as for minimizing the non-critical elements that must be isolated in the physically secure housing, preferably incorporates a central processing unit 80, for example, microcomputer from Rockwell International Corp., El Segundo, Calif. of the 6500 series, that is connected by way of conventional data lines, control lines and address lines to a multipurpose conventional RAM/ROM I/O timer circuit 81 incorporating read-only memories, random access memories, timing control elements and input/output interface hardware. By the use of suitable decoders 82, the keyboard 24 may thereby be scanned in the conventional fashion, and by the use of suitable drivers 84 the display panel 23 may be energized, preferably in a multiplexing mode according to conventional practice. The data relating to the depression of any of the keys 31–40 and 52 of the panel 24 may thereby be communicated to the processing unit 80, for the development of a serial input/output on lines 86 for communication with the accounting module 58 within the secure housing 55. The processor 80 and timing circuit 81 are responsive to the requirement for operator intervention to re-cock a trigger mechanism in the base 21, and the failure to open or close the data door 28 (FIG. 1), following application of power to the register 20, will energize selectively the indicator LED 42 of FIG. 2. The service switch 50 may also be connected to the circuit 81. If further input/output devices are coupled to the control unit 75, such as external display devices or control systems, these may be coupled to the unit by way of further input/output lines 88, preferably serial communication paths which may be suitably isolated by optical isolators. The control unit 75 may include an internal power supply and regulator 89 connected to receive power from the register unit low voltage power as shown in FIG. 3.

The above-discussed functions under the control of the control unit 75 are functions which are not critical in the sense that loss of control or the contents of any component therein will result in loss to the parcel service company, or to the user, of funds. These functions have been relegated to the control unit 75 in order that the secure portions of the register 20 include only that programming of the system which must be secure. Additional functions that may be effected by the control unit 75, such as the addition of sequentially entered amounts may also be controlled by the program of the control unit, since such calculations are not critical to the security of the apparatus, and need not be effected within the physically secure portions of the register 20. Similarly, the service resettable functions may be effected by the programming in the control unit 75, since these functions also are not critical to the accounting system and registers themselves. When it is desirable to retain such parameters in a non-volatile memory, retention in the accounting module 58 is preferred.

It will, of course, be apparent that, in a system such as shown in FIG. 4, further arithmetic keys may be provided, without great difficulty, such that the register may be alternately employed also as a calculator.

Alternatively, the central processing unit 80 and its timer circuit 81 may be augmented by a calculator chip, or the like, connected to the keyboard 24 and display panel 23 for performing arithmetic functions.

While the control unit of FIG. 4, including all of the functions of the panel shown in FIG. 2 is preferably disposed directly in the register 20 to form a part thereof, it will be apparent that this portion of this system may be physically separate therefrom, or separable therefrom, whereby the register 20 itself may incorporate only the elements that are required to be physically secure.

Since monetary information and control is prevalent in the serial communication employed in the system, a high degree of integrity is mandatory. For this purpose, the system is designed, in the serial transmission communication sections, such that a transmitted bit is returned or "echoed" by the receiver thereof for checking purposes. If the transmitter thereby receives all of the echoed signals satisfactorily, it may issue a "no error" pulse, thereby informing the receiver of the information that the received information is valid.

Figure 5:
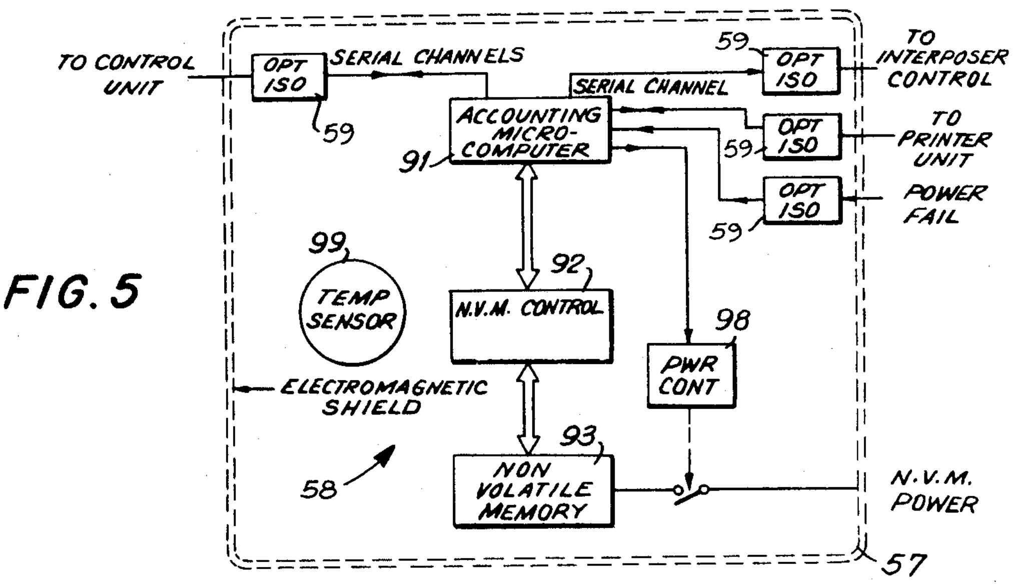
FIG. 5 is a diagram of a circuit for the accounting system of a register in accordance with the invention.

The circuit arrangement of the accounting module 58 is shown in somewhat greater detail in FIG. 5, wherein the walls 57 of the module are illustrated as preferably forming an electromagnetic shield. The circuits include an accounting microcomputer 91 having a non-volatile memory control 92 coupled thereto. The non-volatile memory control 92 controls the application of stored data between volatile memories, which may form a part of the accounting microcomputer 91, and a non-volatile memory 93. The volatile memories, such as random access memories, may function as working ascending registers, working descending registers, and the like. The accounting microcomputer 91 also includes read-only memory control for the necessary accounting routines, as well as control routines. This module 58 may, in addition, incorporate serial interfaces, to enable its interfacing with the printing module 56 and the control unit 75. The microcomputer 91 may, for example, comprise the 8039 series microcomputer from Intel Corporation, Santa Clara, Calif. with a control circuit in a manner similar to that described above with respect to the control unit 75. In order to avoid damage to the accounting module 58 by electric surges applied accidentally or intentionally, and to eliminate electrical noise induced via groundloops, the accounting microcomputer communicates with the devices external of the compartment 57 by suitable optical isolators 59 that are not capable of applying voltage surges to the microcomputer. These isolators may, for example, be in the form of opto-electronic couplers, and are also preferably arranged so as to be inaccessible from the exterior of the postal meter. One optical isolator unit 59 may be provided for the two-way communication path with the control unit 75. A further optical isolator unit 59 may be provided for the two-way communication with the printing module 56 of FIG. 3, in particular, the microprocessor circuit thereof. A still further optical isolator unit 59 may be provided for applying the power sensing signals to the microcomputer 91. In addition, an optical isolator unit 59 may be provided for controlling the interposer in the printing module 56, for example, for mechanically blocking functions of the printer. Such a system is disclosed, for example, in U.S. patent application Ser. No. 024,812 filed Mar. 28, 1979 by R. McFiggans and A. Eckert, and assigned to the assignee of the present invention.

The non-volatile memory 93, at the present state-of-the-art, is preferably in the form of an MNOS memory, which does not require a back-up power source. This memory may, however, alternatively be formed of elements which do require a power back-up, in which case a power control circuit 98 may be employed to apply back-up power thereto externally from the compartment 58. The purpose of the power control circuit 98 is to provide power to the MNOS memory for the purpose of effecting its data transfer operation, essentially during power up and power down. The microcomputing unit 91 enters the contents of the registers of the computer units into the non-volatile memory as soon as any indication of failure of the power supply occurs, and restores this data to the working registers upon restoration of the power. As explained previously, the thermostat 67 in FIG. 3 cuts off power to the register 20 in the event of high or low temperature operation. This automatically places the register 20 in its power down cycle, as a result of the power cut-off.

The accounting module 58 may further comprise a temperature sensor 99, with suitable circuits (not shown) coupled thereto, such as to the microcomputer 91, for transferring data to the non-volatile memory 93 in the event of excess temperatures. The system may further be operative to prevent the operation of the interposer solenoid by way of the isolator 59, in the event of excess temperatures. It will be appreciated that the interposer is controlled by the microcomputer 91 also to inhibit operation of the printer in the event that insufficient postage remains for a printing operation, or when other accounting data indicates that the unit should not be operative.

While the isolators 59 have been indicated as individual units, it is, of course, apparent that these units may incorporate multiple devices, so that two-way communication is established in the respective circuits. It is further noted that systems for the transfer of data between volatile and non-volatile memories are well know, and are disclosed, for example, in copending application Ser. No. 889,627 filed Mar. 24, 1978.

Figure 6:
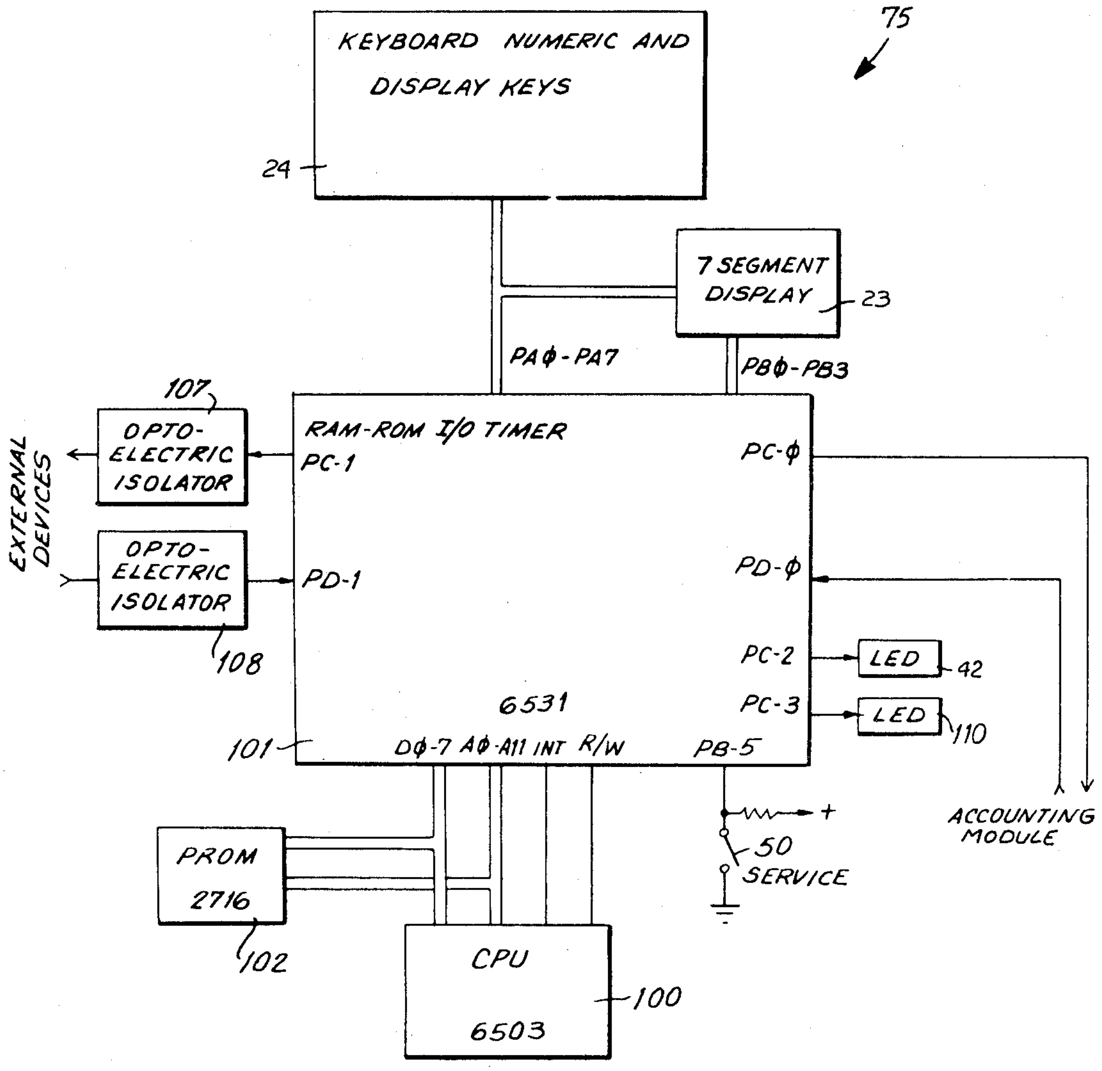
FIG. 6 is a more detailed block diagram of the control unit of FIG. 4.

Referring now to FIG. 6, therein is illustrated in greater detail a block diagram of the preferred embodiment of a control unit 75 in accordance with the invention. In this figure the blocks have been identified by part numbers and terminals where applicable. This control unit 75 is illustrated as incorporating a type 6503 CPU 100 having its data and address lines coupled to RAM/ROM I/O timer circuit 101 as well as to a type 2716 PROM 102, the PROM 102 having stored therein the program for the control unit. Control lines, such as an interrupt line and a read/write line may also be connected to the circuit 101. The circuit 101 has a plurality of ports, as will be discussed.

The control unit 75 further incorporates the keyboard 24 including the numeric keys 31 and the display keys 35–40 shown in FIG. 1. This keyboard 24 also includes the select COD key 52 and the select value key 34. All of these keys are connected in a matrix to the circuit 101, in conventional manner, to permit the scanning of the keys to detect a key closure. The eight-line port A, as well as four lines of port B of the circuit 101, are also connected to the seven-segment display panel 23 for multiplexed display in the conventional manner. The circuit 101 is further connected by a pair of serial ports for communication to and from the accounting module 58. In addition, a pair of further serial ports enable communication to and from external devices, by way of opto-electric isolators 107 and 108, respectively. Another output port of the circuit 101 is connected to the LED display 42 on the display panel 26 for indicating that the dater door 28 has not been closed. A further output port is connected to the other LED 41 on the display panel 23 for indicating that the operator's intervention is required to recock the trigger mechanism on the base. Finally, another port is coupled to the service switch 50, to enable the functions of the register 20 in the service mode.

The control unit 75 is directed to servicing of the keyboard unit 24, display panel 23, etc., so that the control functions and storage of data are effected primarily in the accounting module 58. Such functions include those functions necessary for the scanning of the keyboard 24, multiplexing of the display panel 23, formatting of signals for communication with the other units, and with external devices, etc., so that any new information may be passed on to the accounting module 58.

Figure 7:
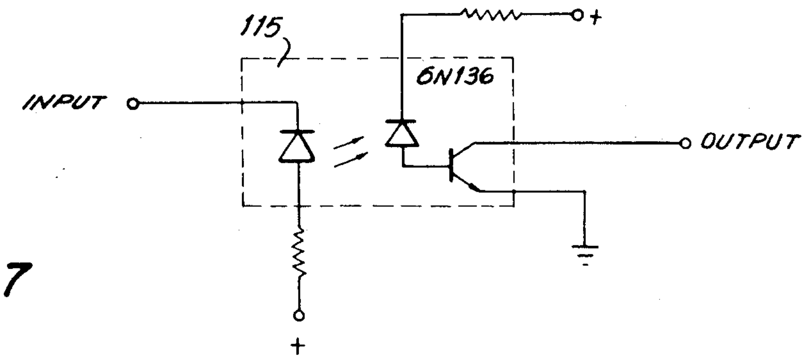
FIG. 7 is a circuit diagram of an opto-electric isolator that may be employed in the register shown in FIG. 1.

A typical opto-electric isolator is shown in FIG. 7, this constituting primarily a conventional 6N136 device 115 including a solid state emitter for producing optical signals for reception by a photodiode, the photodiode being connected in the base circuit of a transistor amplifier.

Figure 8:
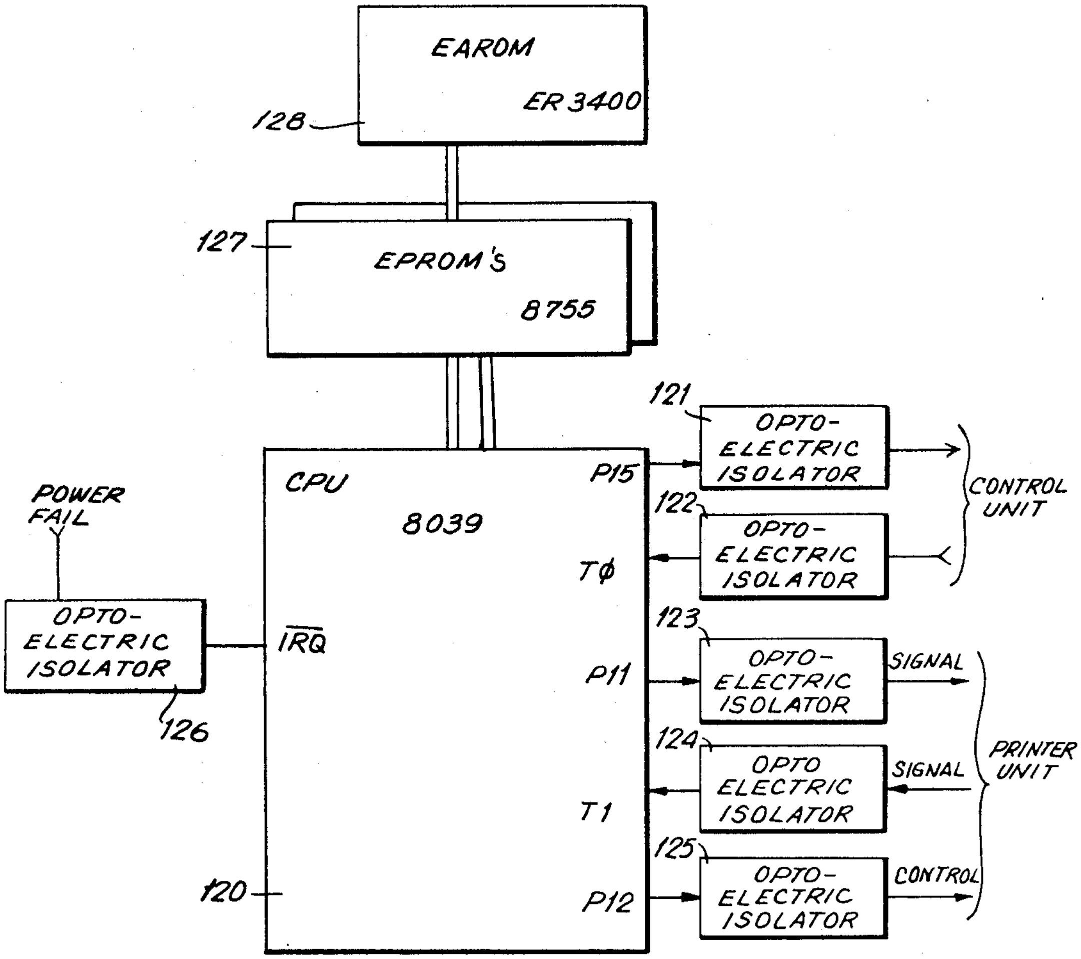
FIG. 8 is a more detailed block diagram of the accounting module that is part of the components shown in FIG. 2.

A block diagram of the preferred example of the accounting module 58 is illustrated in FIG. 8, wherein a type 8039 CPU 120 is shown to communicate with the control unit 75 by way of opto-electric isolators 121 and 122, and to communicate serially with the printing module 56 unit by way of opto-electric isolators 123 and 124. The opto-electric isolators 121 and 122 within the accounting module 58 thus may be connected directly to the corresponding leads of the control unit 75. The isolators 123 and 124 may be connected directly to the printing module 56 signal channels, since no further isolation devices are necessary for this purpose. In addition, a control opto-electric isolator 125, for controlling an interposer or the like in the printing module 56 may be connected to a further port of the CPU 120. Signals corresponding to a pending power failure are further fed to the interrupt port of the CPU 120, by way of opto-electric isolator 126. It is thus apparent that all signal and control to and from the accounting module 58 are directed by way of opto-electric isolators in order to insure the electrical and physical integrity of this unit. The accounting module 58 further includes a plurality of PROMs 127 coupled to the address and data lines of the CPU 120, each PROM 127 for example, being a E-PROM type 8755. This unit is connected to an electrically alterable read-only memory (EAROM) 128, for example, a type ER 3400, serving as a non-volatile memory to store data at times during which the power supply to the register 20 has failed, or has been intentionally disconnected. The working memory for the accounting module 58, including the registers for storing all operational data, are provided in the CPU 120, this data being transferred to the electrically alterable ROM 128 when a reduction of power is sensed. In order to insure the complete transfer of data, storage capacitors may be connected in conventional manner to store adequate power to insure the proper functioning of the circuit until the transfer of data has been effected.

Figure 9:
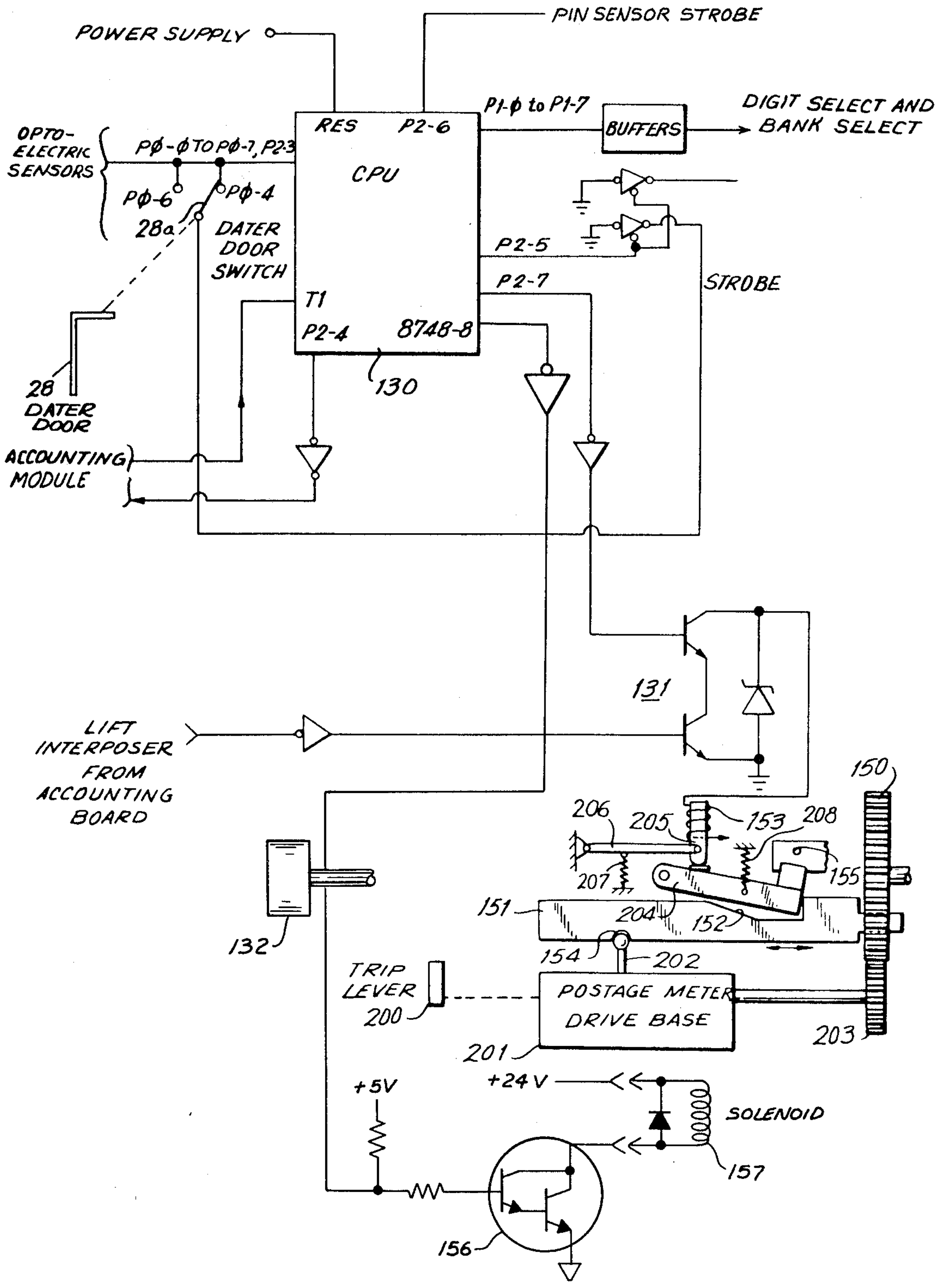
FIG. 9 is a block diagram of the electrical system of the printing unit module coupled to machanical portions of the register shown in FIG. 1.

A preferred example of the circuit of the printing module 56 is illustrated in FIG. 9. This circuit consists primarily of the CPU 130, for example, a type 8048 or 8748-8, the CPU being connected by way of suitable buffers where necessary, to the I/O devices within the printing module 56 itself. The mechanical and opto-electric sensing systems in the printing module 58 are conventional and may be generally of the type disclosed, for example, in U.S. Pat. No. 4,050,374 and aforementioned copending application Ser. No. 024,812. Thus, the CPU 130 is connected to a plurality of opto-electric sensors (not shown) for sensing of the positioning of the print wheels, these lines also being connected to enable the sensing of the position of the PIN inhibiting mechanism. Such mechanical inhibiting mechanisms are shown and described in co-pending patent applications entitled "Inhibiting Means for Postage Register Parcel Identification System" and "Electro-Mechanical Latch Apparatus", both assigned to the assignee of the instant application and both of which are incorporated by reference herein. The CPU 130 output port P2-0 is coupled to a Darlington transistor 156 to control the operation of the inhibiting pawls 157 of the PIN print wheels inhibiting mechanism. The action of the inhibiting pawls 157 will cause the PIN mechanical print wheels to become inhibited or enabled on alternate pulses. The lines of the CPU 130 are further connected to sense the position of the dater door 28, the dater door switch 28*a* and PIN inhibit mechanism being strobed by way of a further output P2-0 of the CPU 130. The LEDs 41, 42 for the optical sensors are strobed at the proper times by way of another output of the CPU 130, and still further outputs of the CPU 130 enable the stepping of the bank and digit stepping motors for the print wheels 132. In addition, the CPU 130 has a pair of ports for serially communicating to and from the accounting module 58. Further, the interposer output from the accounting module 58, and another output of the CPU 130 control a pair of transistors 131 for energizing the interposer solenoid 153, whereby the interposer solenoid is not energized until all the preconditions are met both in the accounting module 58 and the printing module 56. As a result, a printing cycle cannot commence unless the physical and electrical conditions in the register 20 are correct for normal printing.

Still referring to FIG. 9, the driving gear 150 of the register 20, which is mechanically coupled to the printing drum 19 of the register, is positioned in conventional manner to be driven by an output gear 203 of the drive unit 201 of the base 22 which includes a motor, a single revolution clutch and other appropriate mechanical drive members in a conventional manner. The drive unit 201 has a shutter lever 202 engaging a notch 154 in the shutter 151 of the register 20, the shutter 151 being movable into and out of locking engagement with the driving gear 150. The shutter 151 is provided with a further notch 152 positioned to receive a pivoted lever or interposer 204 in the lock position of the register 20, i.e., when the shutter blocks movement of the gear 150. A lever 206 having a fixed pivot at one end, is pivoted at its other end to the core 205 of a solenoid 153, the free end of the solenoid engaging the interposer 204. A spring 207 affixed to the lever 206 urges the core 205 against the interposer 204 in such a direction as to urge the interposer into the notch 152 when the solenoid 153 is de-energized and the notch is aligned therewith. This portion of the system is further provided with a light sensor device 155 positioned to provide a signal to the CPU 130 indicating whether or not the interposer 204 is in an interlocking position in the notch 152 of the shutter for 151. The solenoid core 205 is not mechanically held to the interposer 240, so that, upon energization, the core of the solenoid 153 will not itself effect the withdrawal of the interposer from the notch 152. A light spring 208 is therefore connected to the interposer 204, to pull it from the notch 152 unless the shutter for 151 is jammed against the interposer 204. The spring 208, of course, does not have adequate strength to withdraw the interposer 204 from the notch 152 against the opposite directed force of the spring 207 when the solenoid 153 is de-energized. The reference numeral 200 depicts a trip lever for the drive unit 201 that causes the lever 202 to be inserted and withdrawn from the notch 154. The sensor 155, which may be an LED sensor, may be strobed by the output of the CPU 130 in turn as are the other optical sensing devices in the printing module 56. It is thus apparent that, upon conduction of the transistors 131, the solenoid 153 is energized to cause the interposer 204 to be released from the shutter bar 151, thereby enabling withdrawal of the shutter bar from the driving gear 150 under the control of the shutter lever 202 of the drive unit 201, in the conventional manner. Although the notch 152, utilized as a retaining means, is shown, it will be understood that a laterally extending tab may also be employed. Further, the pivot on the lever 206 is not essential in that a linear movement can be imparted to the lever 206 to catch the shutter 151. Other variations may also be employed.

In the operation of this portion of the system of the invention, it is noted that the two transistors 131 act effectively as an AND gate, whereby, in order to release the driving gear 150, one of the transistors must be rendered conductive by an output of the CPU 130 in the printing module, and the other of the transistors must be rendered conductive by the direct control of the CPU 120 of the accounting module 58 by way of the opto-electric isolator 125. As described above, the transistors 131 each respond to separate input systems, in the respective separate microprocessors, which have coordinated activity as a result of an exchange of messages regarding the status of the different portions of the register.

As a consequence, when a fault or other condition occurs that renders it undesirable for the register 20 to print postage, and this condition is determined in one of the controlling systems, this controlling system renders or maintains its associated transistor non-conductive, and signals the other controlling system to likewise render or maintain its transistor non-conductive. It is thus apparent that faults in either of the transistors, as well as certain faults in the controlling systems will not result in the erroneous printing of postage.

In the normal mode of operation of the system, as above discussed, the six display keys 35–40, when depressed effect the display on the display panel 30 of the six parameters above noted, i.e., the total in the ascending register of all postage that has been printed (35), the total remaining in the descending register of postage available (36), the pin number (37), the total number of printing operations of the register (38), the value of the postage printed (39), and the number of pieces (39) that have been printed since the last batch clear operation of the associated registers. The depression of these keys 35–40 results only in the number of concern being displayed for a timed period after the key is released, for example, two seconds following which the display will return to the postage setting.

If the service switch 50 is placed in the service position, the display function of the display keys will be different. Thus, depression of the "postage used" key 35 will now result in a display of the current value set in the dollar unlock register in the register 20, at or above which an operator cannot print postage. Postage values above this value require an additional depression of the select value key 34 for operation, in order to avoid accidental printing of excessive values. Depression of the "postage unused" key 36 will now result in a display of the value in the COD register at which a warning should be given that the contents of the descending register are below a determined amount. Depression of the PIN key 37 will now result in the display of the serial number of the register 20. Depression of the "piece count" key 38 will now result in a display of the diagnostic status of the register 20. This display provides an indication to the serviceman of possible malfunctions. A depression of the "batch value" key 39 will now result in a display of the maximum settable amount, i.e., the maximum amount set internally within the register 20, above which the meter cannot set the print registers. Depression of the "batch count" key 40 will yield the number of power on-off cycles.

As above discussed, each of the three units of the register 20 has a microprocessor with a read-only memory defining a given program, and the communication between the units is effected serially and asynchronously. This is achieved in the first place by providing each of the computer systems with a crystal controlled clock. Further, the signals are defined such that the transitions thereof are closely controlled, whereby it is insured that, if a signal is present, it must be present within a given time period. As a still further insurance of the correctness of communication, the bits of a signal are returned to a transmitter as soon as they are received, for error checking at the transmitter, whereby a "no error" bit may be transmitted immediately following a data message if the data has followed correctly.

The program of the control unit 75 responds to the status of the register 20 with respect to determined parameters. A register in the microprocessor of the accounting module 58 holds meter status information, for example, of two bytes, the bits of which digitally indicate if the register 20 trip mechanism requires recocking, if the dater door 28 has not been opened following the last application of power or is presently open, if the PIN inhibit mechanism is enabled, if the register 20 is in a service mode, if the register 20 is enabled, if the batch registers are clear, if a trip has been completed, or if various types of errors have occurred. The status message associated with these bits is not the same as the diagnostic message noted above that is employed in the service mode. The accounting module 58 keeps the control unit 75 informed of the current status by transmitting status message to the control unit after power has been turned on and thereafter, whenever a change in status occurs, the control unit responds to all such messages by insuring that the visual display 23 is consistent with the status message as above discussed. These later steps may include, for example, the display of a row of decimals in the event of certain errors or the displaying of underscores in the place of blanks if the register 20 is in the service mode.

An interrupt program in the control unit 75 interrupts the main program of the control unit at regular intervals in order to scan the keyborad 24 and to drive the display 23. In order to prevent the display 23 of spurious characters which can be produced by sneak currents when more than one key is pressed, the interrupt program will cause the display to go blank instead. Such values as relate to time and keyboard are maintained by the interrupt program for use by the main controller program.

The main program for the control unit 75 includes the initializing steps, program steps for the transfer of messages back and forth between the accounting unit and external devices, and control of the timed display 23, the checking of the status message to insure that dater door 28 and reset base lights 42 are lit in accordance with the status, responding to the reported positions of keys to ascertain changes of state therein so that the control unit subroutine which corresponds to the function defined for such a state or change of state will be executed.

The program of the accounting unit 75 includes initialization procedures to insure that the working registers are brought up to date, and that no postage has been printed that has not been accounted for, as well as a power down processing program to effect the transfer of data to the non-volatile (electrically alterable) memory in the event that the power is shut down or is failing.

The main program of the accounting module 58 effects the transmission of the register 20 status message to the control unit 75 upon request or change in status, determines the effect of any currently entered postage value on the funding data currently registered and makes any necessary variations in the status message. The main program also controls the timing in the accounting module 58 for receiving messages from the control unit 75 and the printing module 56. The accounting module 58 program further includes subroutines for processing of signals in the bringing of the registers up to date when postage is to be printed, and for controlling the operation of the system when the register 20 is tripped. A further subroutine controls the bringing of the register 20 status message up to date. In addition an error checking routine which involves cyclical redundancy checking is programmed in the accounting module 58 software. This will be described in further detail below.

The program of the printing module 56 includes a main program having initializing steps, steps for scanning the sensors and controlling the strobes for the LEDs of the sensors, and the processing of messages for communication with the accounting module 58. Subroutines are provided for the setting of the postage wheels, to determine if sensor readings are proper, and to determine if any changes have been made in the outputs of the various hardware sensors and switches such as the dater door switch 28*a*.

With further respect to system diagnostics, briefly referred to above, two basic error checks are provided in the software routine of the meter. These two checks are termed fatal and procedural, respectively. Under the category of fatal error checks, two sub-categories are defined. These two sub-categories are termed hard and soft, respectively. Hard errors are determined by monitoring hardware sensors, such as the bank and digit select sensors, interposer position sensors, shutter bar sensor, and the like. A failure of these sensors to provide proper readings will be termed a fatal hard error, will lock up the meter and will be non-recoverable upon power-up. Central authority intervention will be required to permit further operation of the meter.

Another example of a fatal hard error is a resulting non-compare from a cyclic redundancy check. Each data register is continually monitored. Using standard polynomial techniques, a cyclical redundancy remainder is calculated for each updated data register value. When a power-down cycle is initiated, the contents of each data register and its associated cyclical redundancy remainder is transferred to non-volatile memory. Upon power-up, the cyclical redundancy remainder of each data register is again calculated and compared to the cyclical remainder previously calculated upon power-down. A non-compare will produce a fatal hard error.

Fatal soft errors relate to the intercommunication capability of the meter units. Thus, communication errors between internal units such as the accounting, printer and control units will be sensed, based upon the bit retransmission previously described. In addition, communication time-out functions are provided, so that the failure of a unit to communicate within a specified period will also produce a soft fatal error. Soft fatal errors will block meter operation. Unblocking can be effected by recycling the meter; that is to say, the meter is turned off, then on again, thereby causing recycling and clearing the error. The power recycling will be counted in a data register and, as noted above, upon reaching a predetermined number, could cause total lock up if desired. In other words, a predetermined number of soft fatal errors equals a single hard fatal error.

Procedural errors, such as improper, for example, (high) value entries, or an attempted improper procedure, manifest themselves as visual flags on the display.

Other diagnostic checks, as well as variations as set forth above, may be easily accommodated within the software routines implemented herein.

By allowing data to be communicated between units on a message basis, serially, and by employing the "echo" technique previously described, the implementation of the foregoing error checking capability is achieved expeditiously.

As above discussed, the inter-unit communication is serial channel, bit synchronous, character asynchronous, start/stop communication, for example at 9600 baud. The communication is solely on the basis of messages, i.e., separate control lines are not provided between the units for control of the communications. This type of communication is also provided for with respect to communications between the control units and external devices. The messages are 10 bits long, each including a start bit followed by an 8 bit word, or byte, and terminating with a stop bit. The last stop bit of a message has a sense opposite to that of all other stop bits of the message, in order to indicate the end of the message. A logical zero is indicative of a start bit, an end of message bit, and a data zero or low. A logical one is provided for a request to send, a clear to send, an end of byte, a data one level, and also as the presence of a no-error pulse. The first word of any message has a coded field stating whether the message contains information, data or control functions, indicates whether or not the message concerns the display only, or if it only concerns the accounting unit and specific message identification bits.

If the messages have more than one word, the second word of the message may contain a format byte, consisting of two nibbles, i.e., four-bit groups. The first nibble tells the number of nibbles of data in the message, and the second nibble gives the number of digits to the right of the decimal point of the data, or corresponds to a hexadecimal F if there is no decimal point.

When a message is ready to be sent by a unit, the receive line of the unit is first tested. If it is low then the transmitting device raises its send line to a high, and again tests the receive line. If it is still low, the unit is free to transmit, otherwise, it must become a receiver. This avoids contention between two units. With respect to units of the postage meter itself, the programs of the different units, in the event of possible contention, give priority to the printing module 56, accounting module 58, control unit 75 or external device in descending order. When external devices are interconnected with the register 20, i.e., to the control unit 75, the control unit is given priority.

Figure 10:
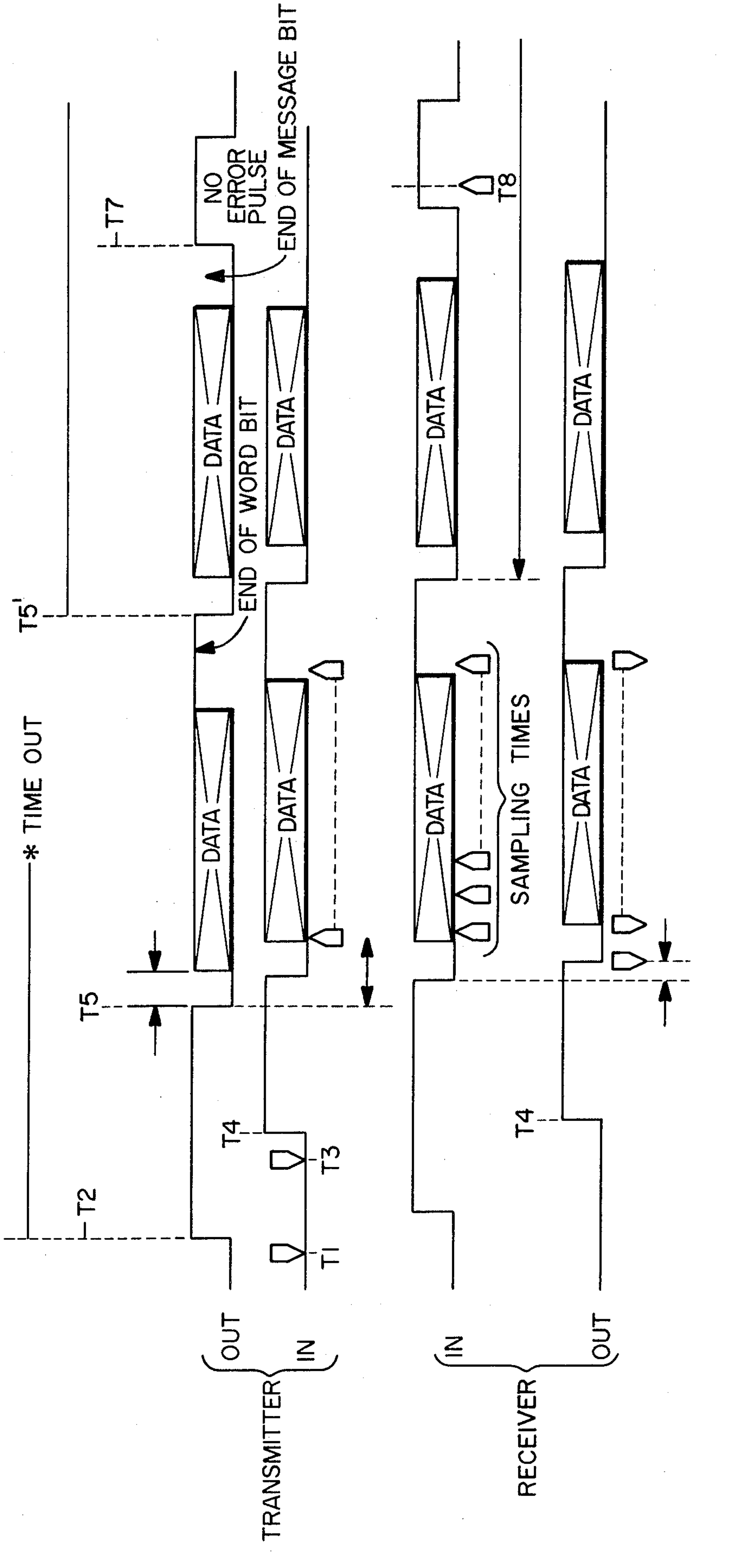
FIG. 10 is a timing diagram illustrating the recommunication operation of the invention.

The timing of the messages constitutes the crux of the communication system whereby the messages may be asynchronous. Typical timing is thus illustrated in FIG. 10, which illustrates the relative timing of the lines of the transmitter for sending a given message, and on the lines of a receiver for receiving the same message. Since the transmitter output line is the same as the receiver input line, it will be evident that these two signal lines are identical. The same is true, of course, with respect to the transmitter input line and the receiver output line.

In a successful transmission system of this type, the transmitter tests its input line at the time $t_1$ and, if a low is detected, raises its output line to a high within 50 microseconds, as shown at $t_2$. The transmitter then again tests its input line at time $t_3$ within 50–100 microseconds. If the input line is still at a low then the transmitter can start to send its message at time $t_5$ following a minimum wait of 120 microseconds, by the lowering of this output line to form the start bit of the message. In the meantime, at time $t_4$, the receiver has raised its output line to a high level in a minimum of 100 microseconds indicating it is ready to receive data. This indicates a "clear to send" condition. The timing between the succeeding bytes of a multibyte message, as indicated by the time interval between $t_5$ and $t_5$ prime, is 1134.375 minimum, in order to insure that the receiver has enabled to effect proper reception and storage of the signals.

The time from the beginning $t_5$ prime of the last message byte and the transmission of a no-error pulse at time $t_7$ is set at 1031.25 to 1157.291 microseconds, and the no-error pulse has a width from 309.375 microseconds to 368.228 microseconds. The receiver must test for the occurence of a no-error pulse at time $t_8$ from 1187.291 to 1340.625 microseconds following the initiation of the start pulse of the last byte of the message. The transmitter bit transitions must be in accordance with table I, and the receiver sampling of the data and stop bits must be in accordance with the timing illustrated in table II.

TABLE I

| n | BIT | MINIMUM | MAXIMUM |
|---|---|---|---|
| 1 | START | 0 | 0 |
| 2 | DATA 1 | 103.125 | 105.208 |
| 3 | DATA 2 | 206.250 | 210.417 |
| 4 | DATA 3 | 309.375 | 315.625 |
| 5 | DATA 4 | 412.500 | 420.833 |
| 6 | DATA 5 | 515.625 | 526.042 |
| 7 | DATA 6 | 618.750 | 631.250 |
| 8 | DATA 7 | 721.875 | 736.458 |
| 9 | DATA 8 | 825.000 | 841.667 |
| 10 | STOP | 928.125 | 946.875 |

TABLE II

| n | BIT | MINIMUM |
|---|---|---|
| 1 | START | — |
| 2 | D1 | 115.208 |
| 3 | D2 | 220.416 |
| 4 | D3 | 325.624 |
| 5 | D4 | 430.832 |
| 6 | D5 | 536.040 |
| 7 | D6 | 641.248 |
| 8 | D7 | 746.456 |
| 9 | D8 | 851.664 |
| 10 | STOP | 956.872 |

With the above timing, and the use of crystal control for the clock of each of the units asynchronous transmission is thereby feasible so that control leads for this purpose between the units are unnecessary.

Further, in accordance with the invention, in order to insure that the information is correctly received by the receiver without error, the data is sequentially returned to the transmitter on the receiver output line. The times for the retransmission of the data, from the beginning of the instruction loop detecting start bit, are given in table III, and the times for sampling this data on the input line to the transmitter are given in table IV.

If, and only if the received data at the transmitter is the same as the sent data, will the no-error pulse be transmitted at the end of the message.

As a further control over the message communication, the transmitter will wait for 3.5 milliseconds for a clear to send signals from the receiver after presenting a request to send transmission, and similarly, the receiver will wait for about 3.5 milliseconds macimum for the start of a message after presenting the clear to send message. Contention between units is further minimized by setting determined periods that must be existent between adjacent transmitter activity of a unit, as well as between adjacent receivers.

TABLE III

| n | BIT | MINIMUM | MAXIMUM* |
|---|---|---|---|
| 1 | START | 32.083 | 73.125 |
| 2 | D1 | 137.292 | 176.250 |
| 3 | D2 | 242.500 | 279.375 |
| 4 | D3 | 347.708 | 382.500 |
| 5 | D4 | 452.917 | 485.625 |
| 6 | D5 | 558.125 | 588.750 |
| 7 | D6 | 663.333 | 691.875 |
| 8 | D7 | 768.542 | 795.000 |
| 9 | D8 | 873.750 | 898.125 |
| 10 | STOP | 978.958 | 1001.250 |

*Allows 10 usec for program loop uncertainty in detecting start pulse. If uncertainty is greater than 10 usec the excess should be subtracted from each maximum value.

TABLE IV

| n | BIT | MINIMUM | MAXIMUM |
|---|---|---|---|
| 1 | START | 103.125 | 135.208 |
| 2 | D1 | 206.250 | 240.416 |
| 3 | D2 | 309.375 | 345.625 |
| 4 | D3 | 412.500 | 450.833 |
| 5 | D4 | 515.625 | 556.041 |
| 6 | D5 | 618.750 | 661.250 |
| 7 | D6 | 721.875 | 766.458 |
| 8 | D7 | 825.000 | 871.667 |
| 9 | D8 | 928.125 | 976.875 |
| 10 | STOP | 1031.250 | 1082.083 |

All control and data signals utilize the same pair of conductors in each direction with precisely defined timing for control.

For providing external control, the control flow is in one direction and information flow in the other direction.

All control of the register 20 and all information inside the register can be controlled by connection through an interface connector along lines 88, FIG. 4. All functions performed by the register 20 are controllable electrically from a remote location, except purely local manual functions such as power on and date change. This results from the communication capability of the data units. The software routine will scan for the presence of an external control device, and permit subrogation of control to such external device upon recognition of its validity. The organization of the three units results in a flow of commands or control of data from the control unit to the accounting unit and then to the printer unit. A new value of postage, and where it is to be set, is one example of such data and command. The flow of information is in the opposite direction. For example, a current register vlue of the like. Within this concept, connection of an external device, such as an electronic scale into the control unit 75, can operate to place commands or data control instruction information into the register 20. The interface operation allows the external device to take control of the register 20, including the disabling of the keyboard 24 is desired. The external device interfaces with the register on a message basis. The external device can send messages to be displayed, or can send messages requesting the contents of the display. The control unit 75 programming will permit the external device to send a message disabling the keyboard 24, thereby implementing the subrogation function. One specific advantage of the foregoing arrangement is that the control unit 75 may by physically replaced by an attached external operating device, without any changes in the accounting module 58 or the printing module 56, either in hardware or software.

Figure 11:
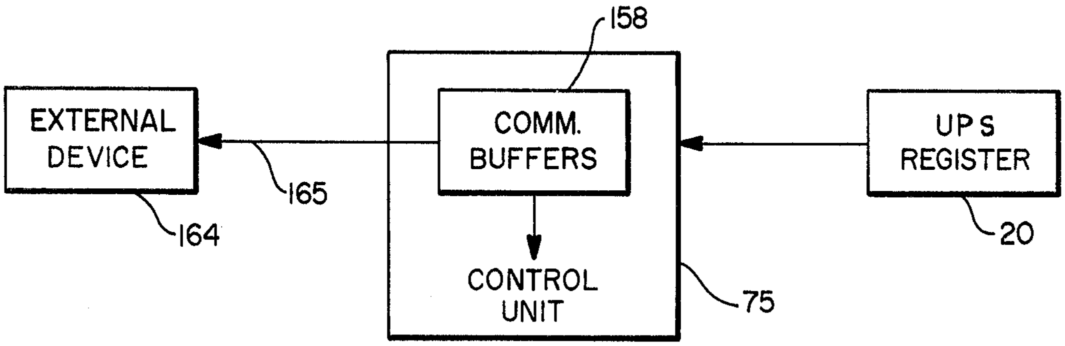
FIG. 11 is a logic diagram illustrating transmission from the meter.
Figure 12:
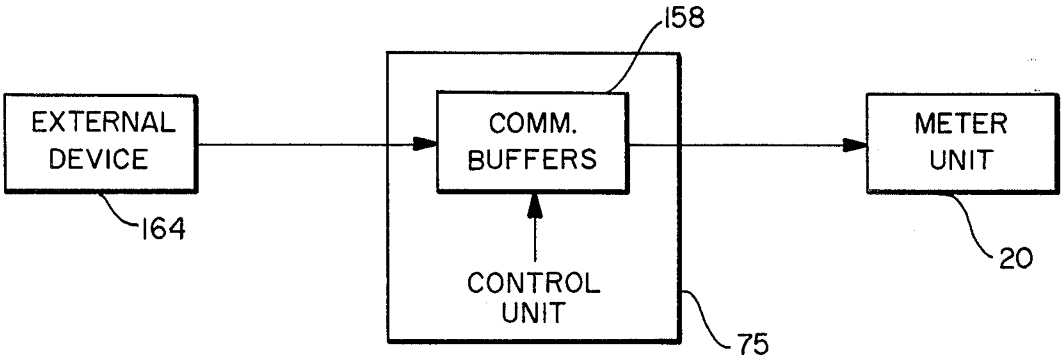
FIG. 12 is a logic diagram illustrating transmission to the meter.

The external device can include a plurality of operating devices, such as a scale and a remote display. The control unit microprocessor 80 can be used to function as a message buffer to allow for flexibility in the development and use of external devices. External devices may include weighers, displays, or other type of device normally interfacing with meters of the type disclosed herein. The software provided in the control unit 75 can be implemented for this function. As shown in FIG. 11, an external device 164 may be used to replace or supplement the control unit 75 function. The external device 164 is preferably coupled through a connector 165, which may be a standard nine pin connector, to the register control unit 75, and receives messages from the register 20. The schematic illustration of the register 20 includes the accounting module 58 and the printing module 56, as previously described. The control unit 75 includes communication buffers 158 which will logically direct communication from the register 20 to the external device 164 or locally to the control unit 75. The opposite effect is shown in FIG. 12, wherein external devices may communicate with the control unit 75 through the communications buffer 158. The effect is similar in that the buffer will receive messages from either the external device 164 or locally from the control unit 75.

Figure 13:
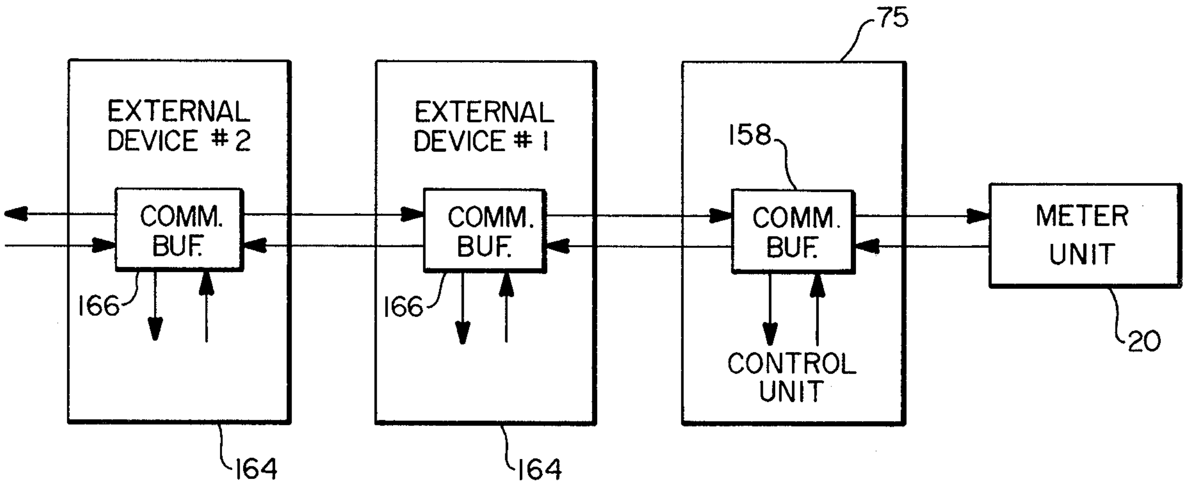
FIG. 13 is a diagram illustrating multiple external devices daisy chained to the meter.
Figure 14A:
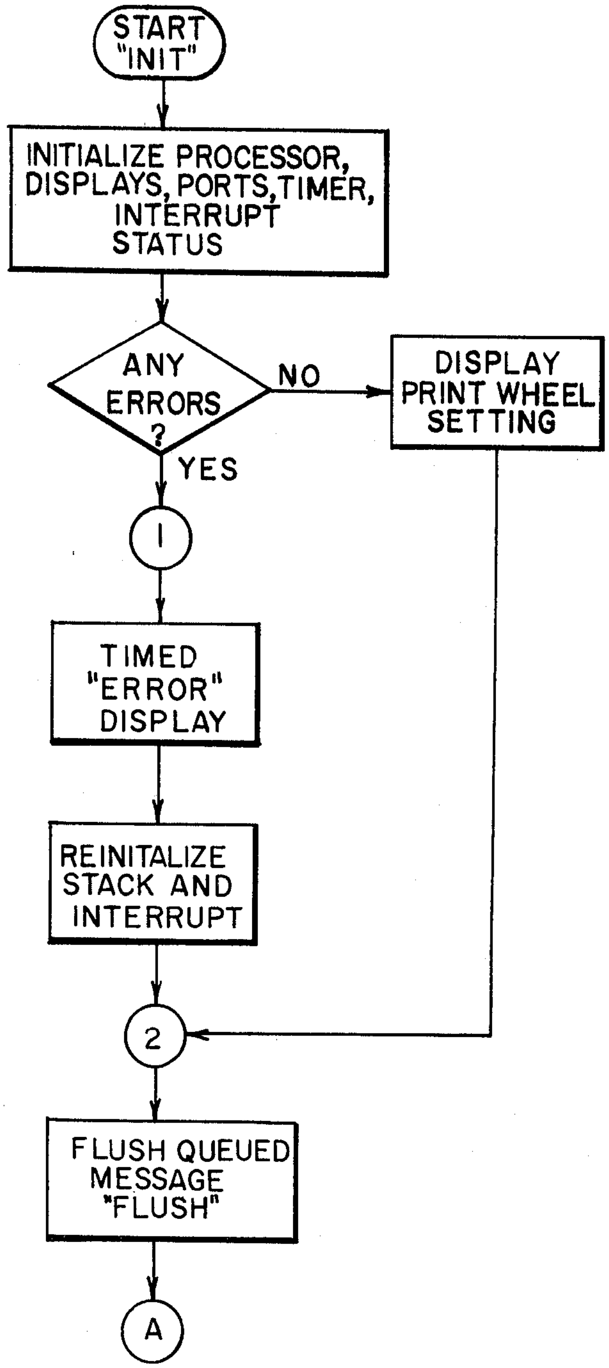
FIGS. 14*a*–14*f* are sequential flowcharts illustrating the control module operation.
Figure 14B:
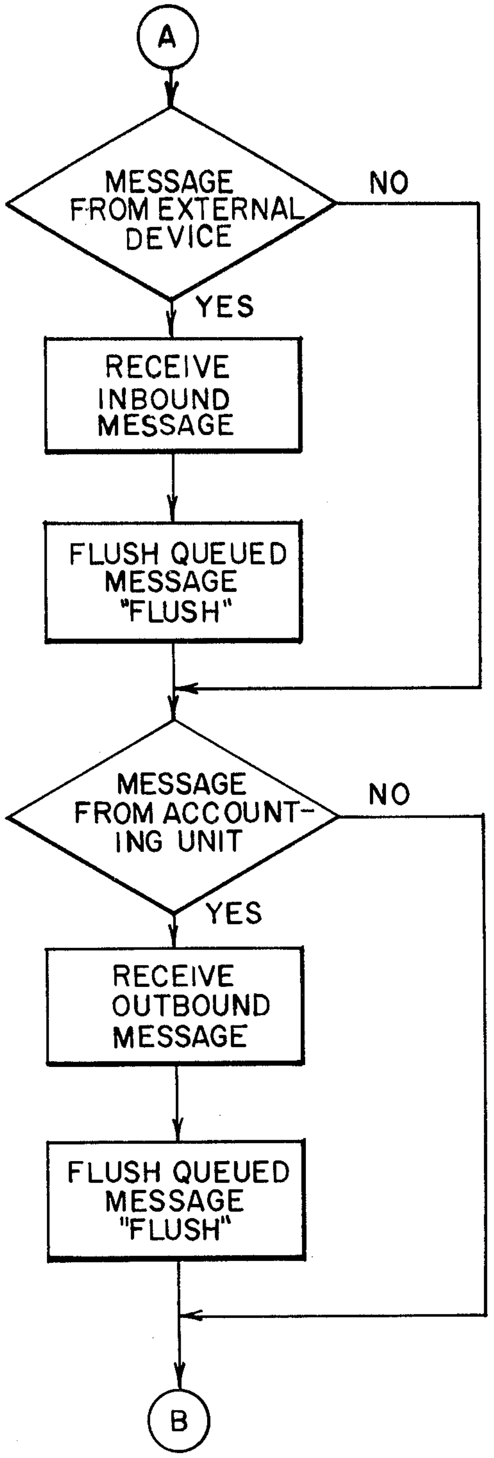
Figure 14C:
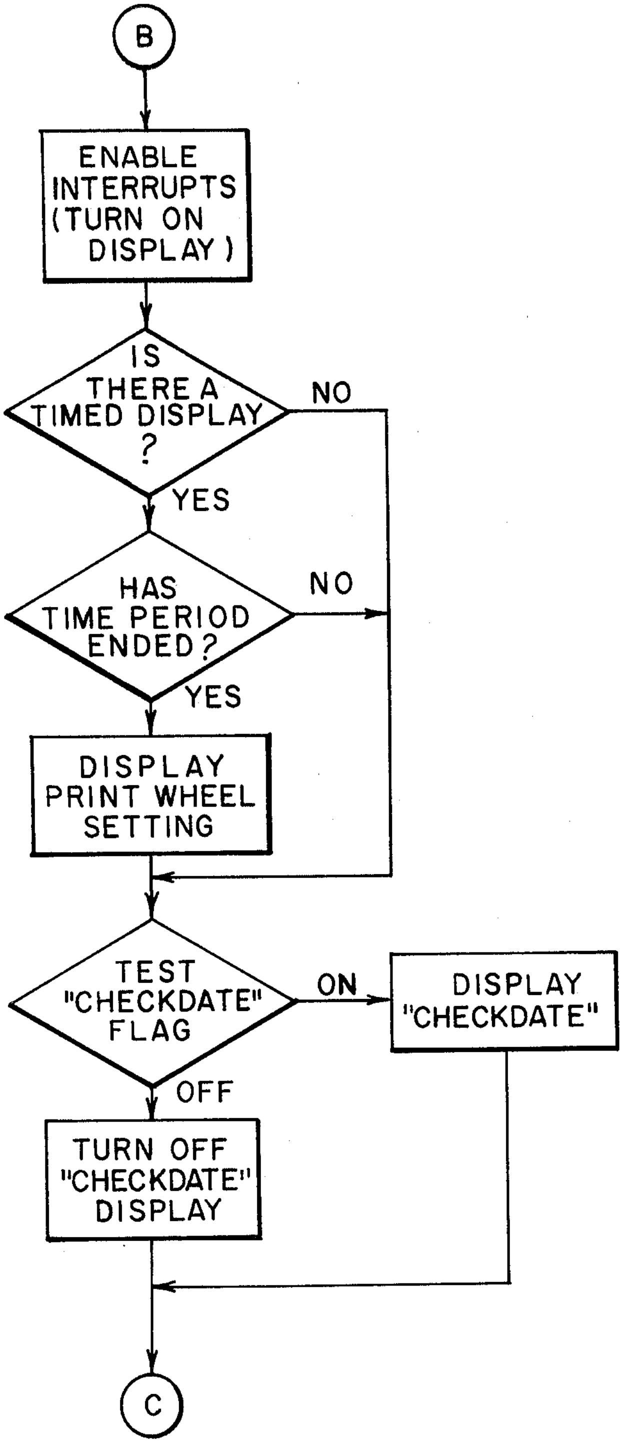
Figure 14D:
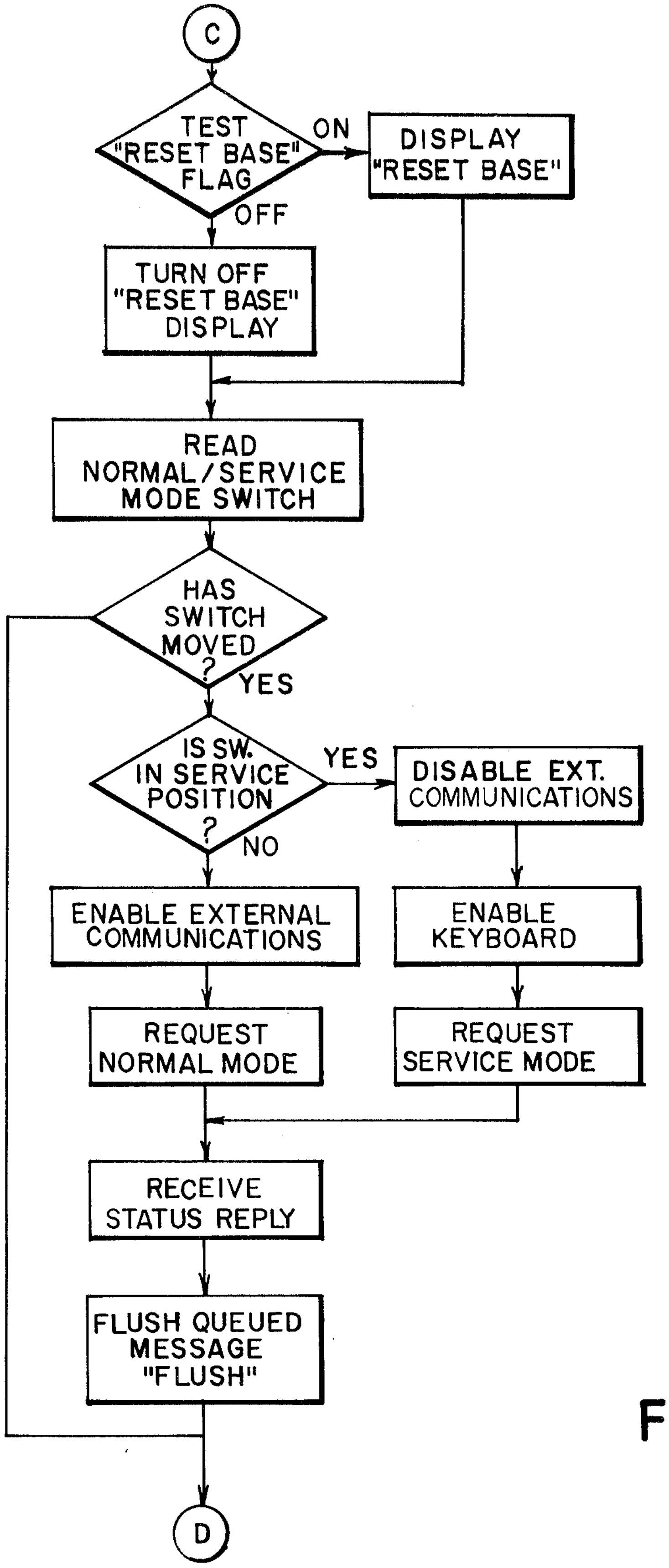
Figure 14E:
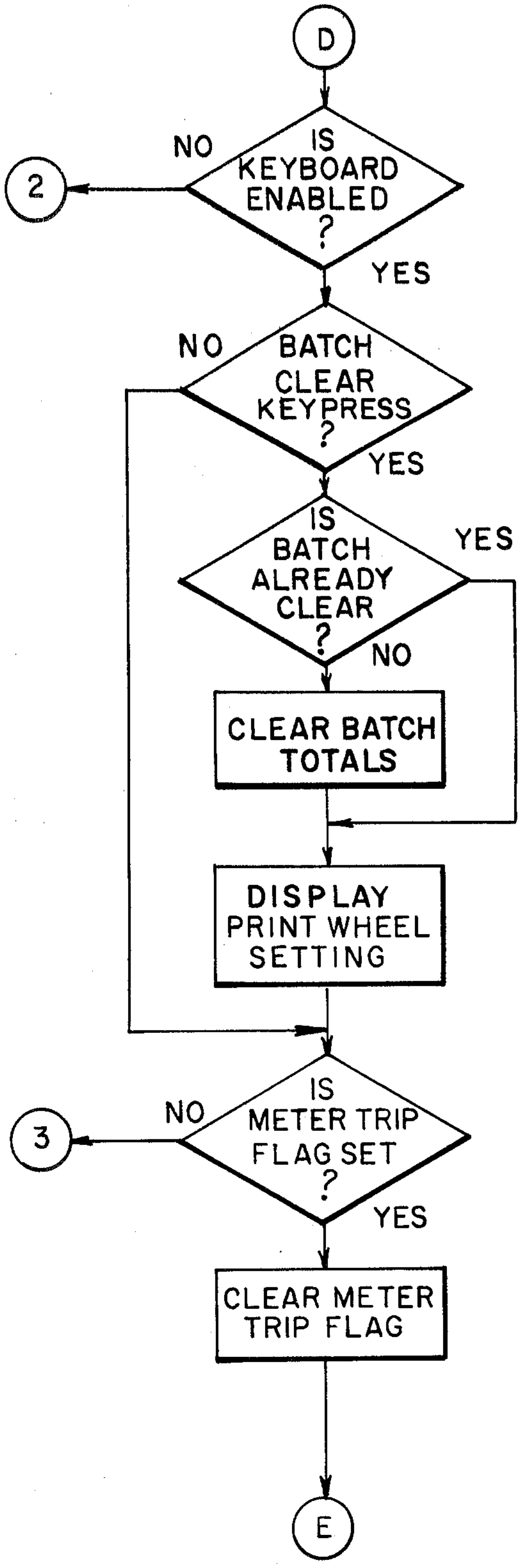
Figure 14F:
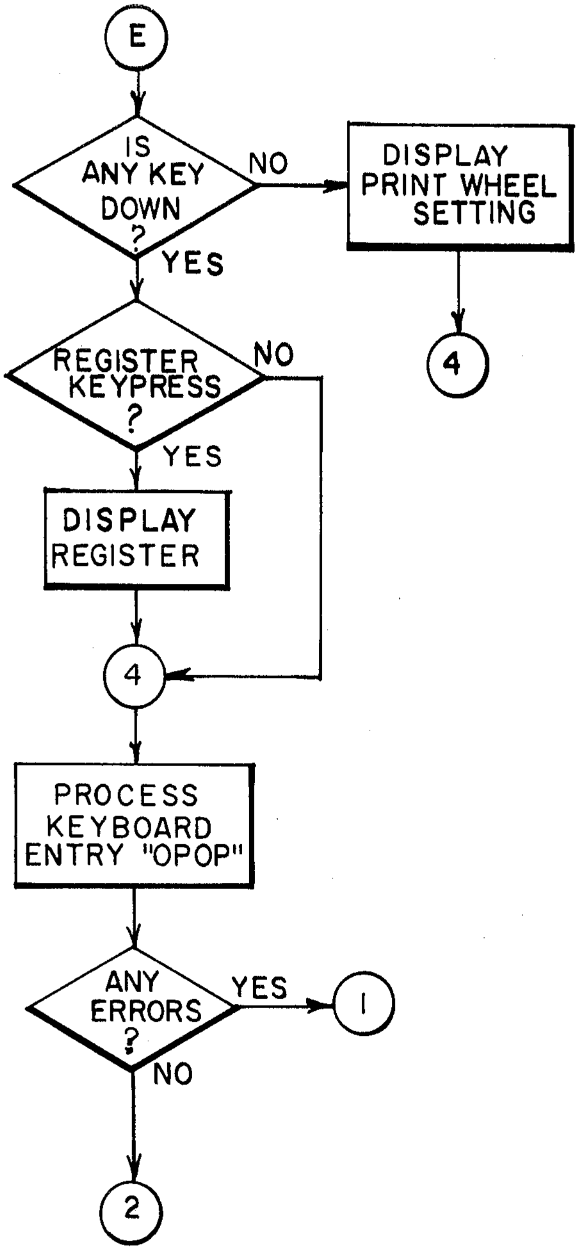
Figure 15A:
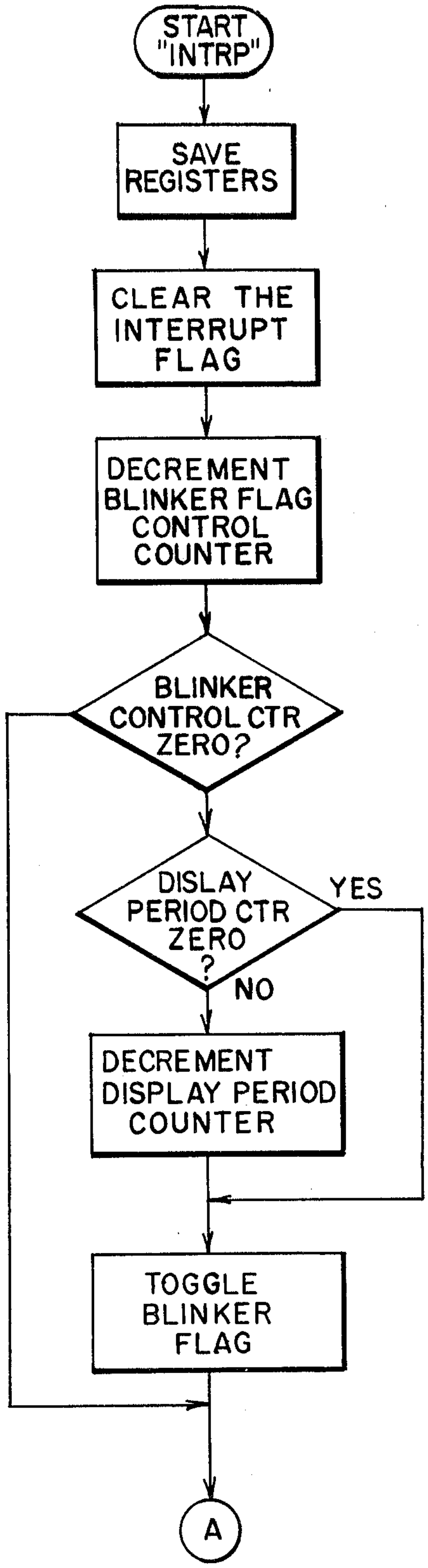
FIGS. 15*a*–15*d* are sequential flowcharts illustrating the interrupt processing of the control module operation.
Figure 15B:
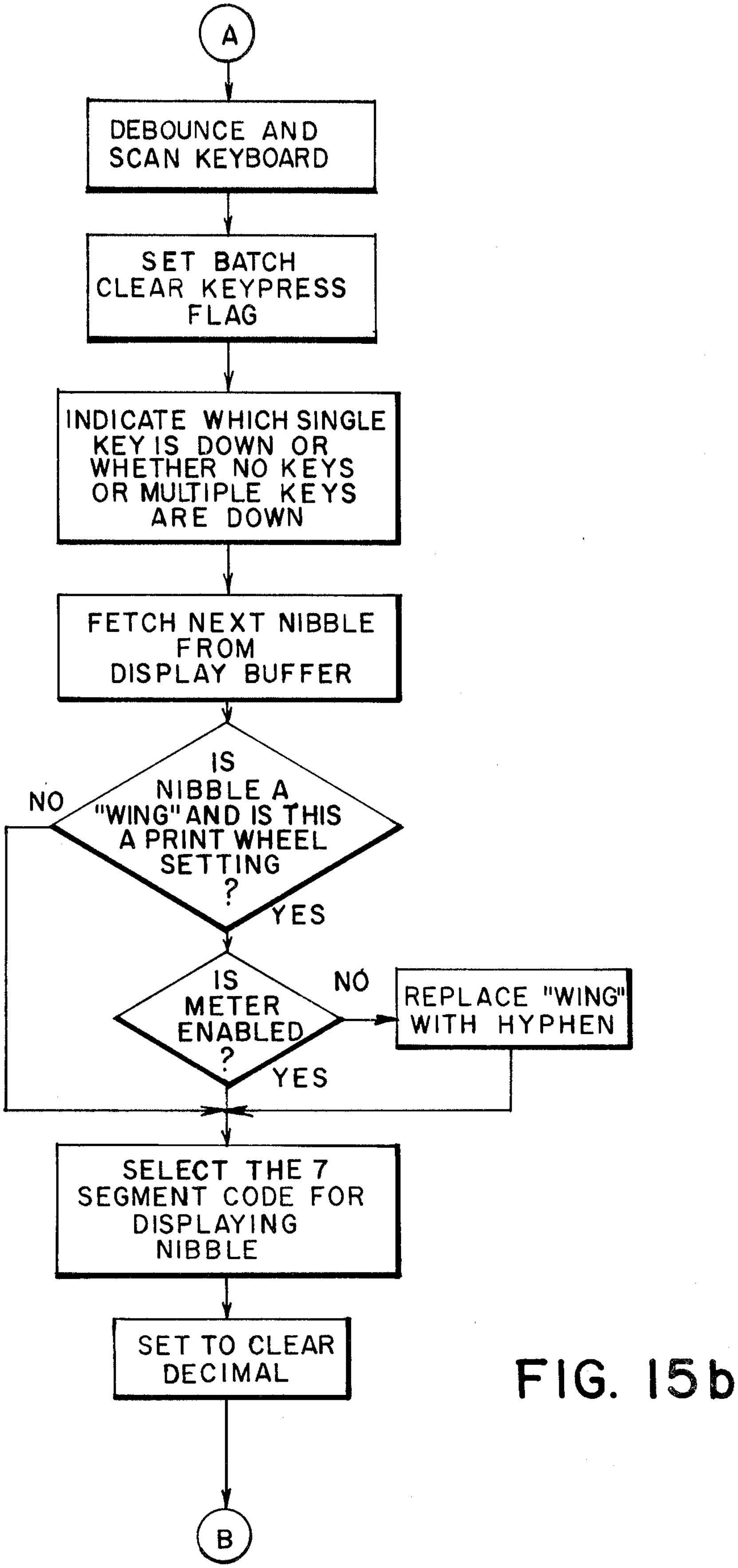
Figure 15C:
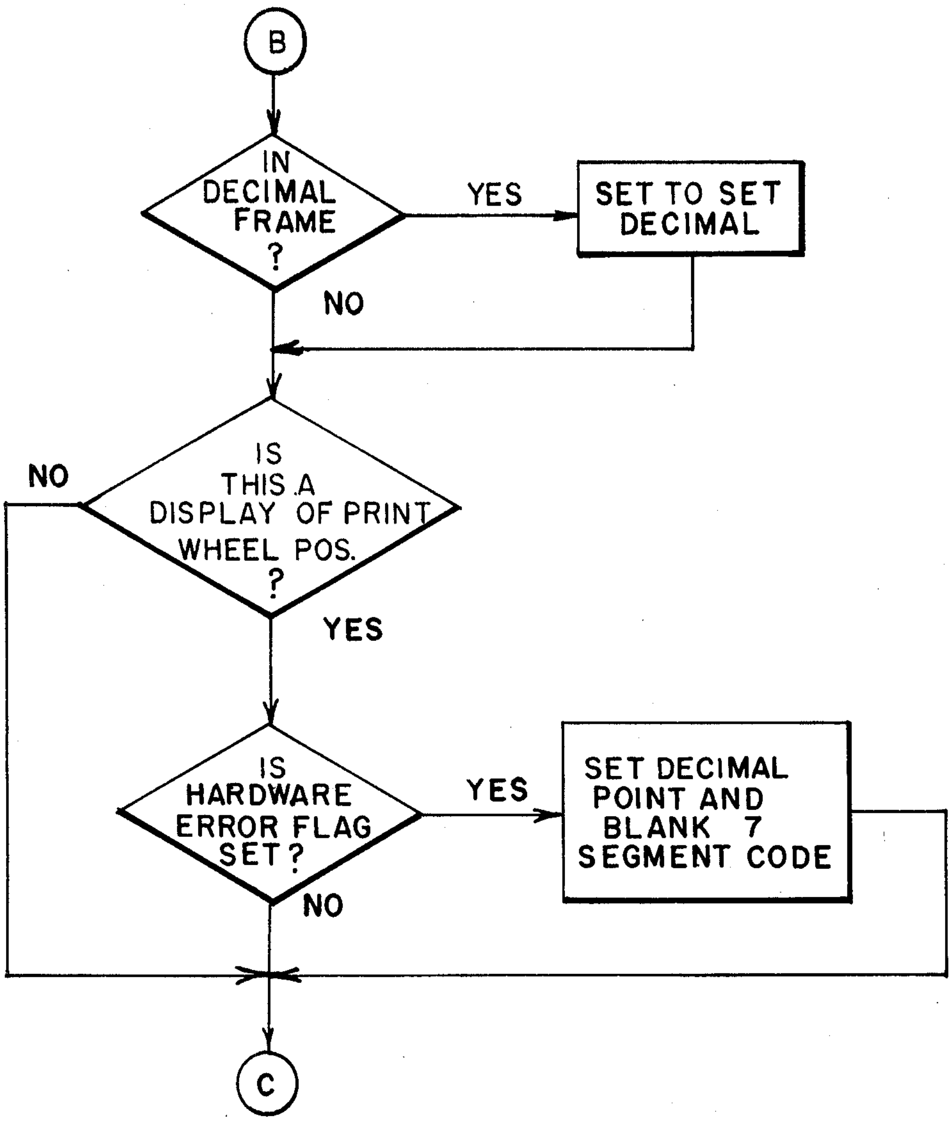
Figure 15D:
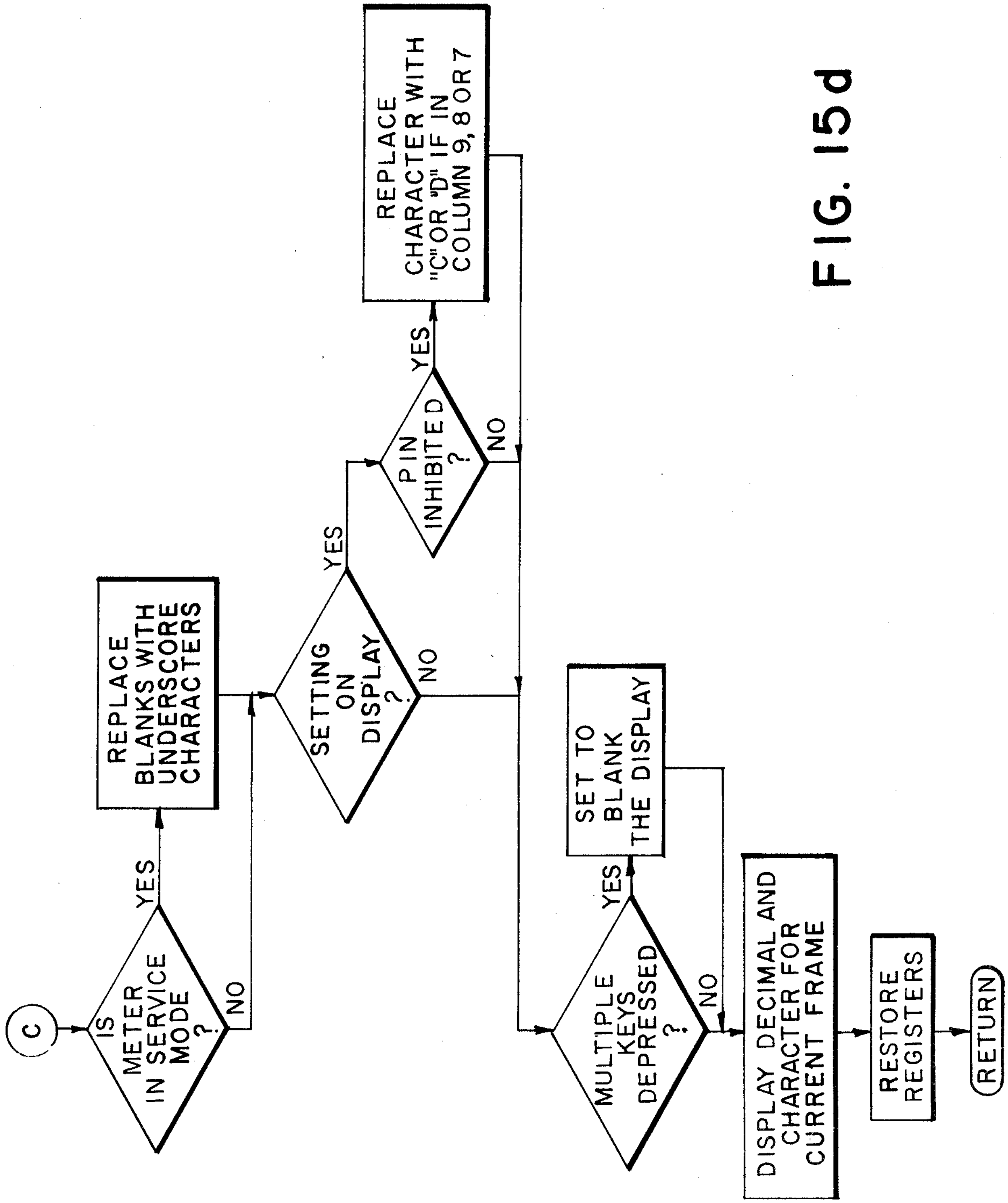

In FIG. 13 a plurality of external devices 164 are shown, interfaced through the control unit 75 into the register 20. Each external device 164 may be provided with its own control key for initiation of messages. Each external device 164 could include a communication buffer 166 as part of its software to permit operation of the external devices in a daisy chain manner. Appropriate messages can include complete subrogation of the control unit 75 logic to the external device. The control unit 75 programming is designed to permit such operation.

Regarding external device operation, information flows in two directions, either inbound towards the register 20 or outbound towards the external device. Control signals and requests, defined generally as controls, flow inbound towards the register 20. Informational data flows outbound. Normally, on the inbound leg controls originate in the control unit 75; however, this feature will let an external device 164 issue commands through the control unit 75 to the register 20. Conversely, informational data on the outbound leg, from the register 20 (accounting) comes to the control unit 75 and is repeated on the external connector 165 to the external device 164 if an external device is present. The presence of an external device 165 is determined by whether or not it responds with a clear to send signal. If not, the output on the connector 165 goes off after a pre-set time period (times out) and the register 20 continues to function normally. This ability to pass information through the communication buffer 158 in the control unit 75 allows the advantage of placing external devices 164 thereon. The external device 164 may be constructed in the same manner, with a communication buffer 166, as shown in the control unit 75, such a device may, in turn, have another external device coupled thereto. Thus, a daisy chain of external devices 164, as shown in FIG. 13, can be provided. The only limitation on the number of external devices 164 which may be daisy chained in this manner would be system tolerance and time out restrictions.

It is a further feature to provide external devices 164 to give certain commands to the control unit 75 itself, which commands need not necessarily go into the accounting module 58, such as the ability to write a message to the display 23 or to read a message from the display 23 or command the control unit 75 to disable the keyboard 24. In so doing, the communication buffer 166 responds to a bit in the beginning of the digital transmission message sequence, or header, and directs whether the message is to go to the register 20 or the control unit 75. This bit, which has an assigned location in the header, as described above, is assigned a "1" in that position if it is a message to or from the control unit 75 and a "0" if it is a message to or from the register 20. In this manner, the control unit 75, when it receives a message from the external device, can examine the header and from this bit determines whether the message is for the control unit 75 or for the accounting module 58. If it is for the control unit 75, it stops the message and takes the appropriate action. If it is not for the control unit, the message is relayed to the register 20.

The control unit 75 can provide a direct reply to the external device 150 without involving the register 20 at all, for example, in response to receipt of a message to be read in the display 23. The control unit 75 does not retain the last register 20 status message received. Thus, when a keyboard 23 disable command is received, for example, the control unit 75 will request a register 20 status message from the accounting module 58. When the control unit 75 gets the response, it will insert a bit into the register 20 status message to indicate whether the keyboard 24 is enabled or disabled. Once disabled the control unit 75 will continuously indicate a disabled state in the status message, will reset by receipt of a keyboard 24 enable command, or until power is turned off and on. The keyboard 24 will always be in the enabled state on a power up condition.

The register 20 is thus capable of interfacing directly with external devices 164, something that is difficult to impossible to accomplish with present register 20.

Summarizing the above, the control unit 75 is provided with a connector for bi-directional communication with a variety of external devices 164. This enables the external devices 164 to access register 20 information, such as register 20 readings, piece count, and current value selection. In addition, an external device 150 can control the register 20 to the same extent that the operator could from the keyboard 24.

Figure 16A:
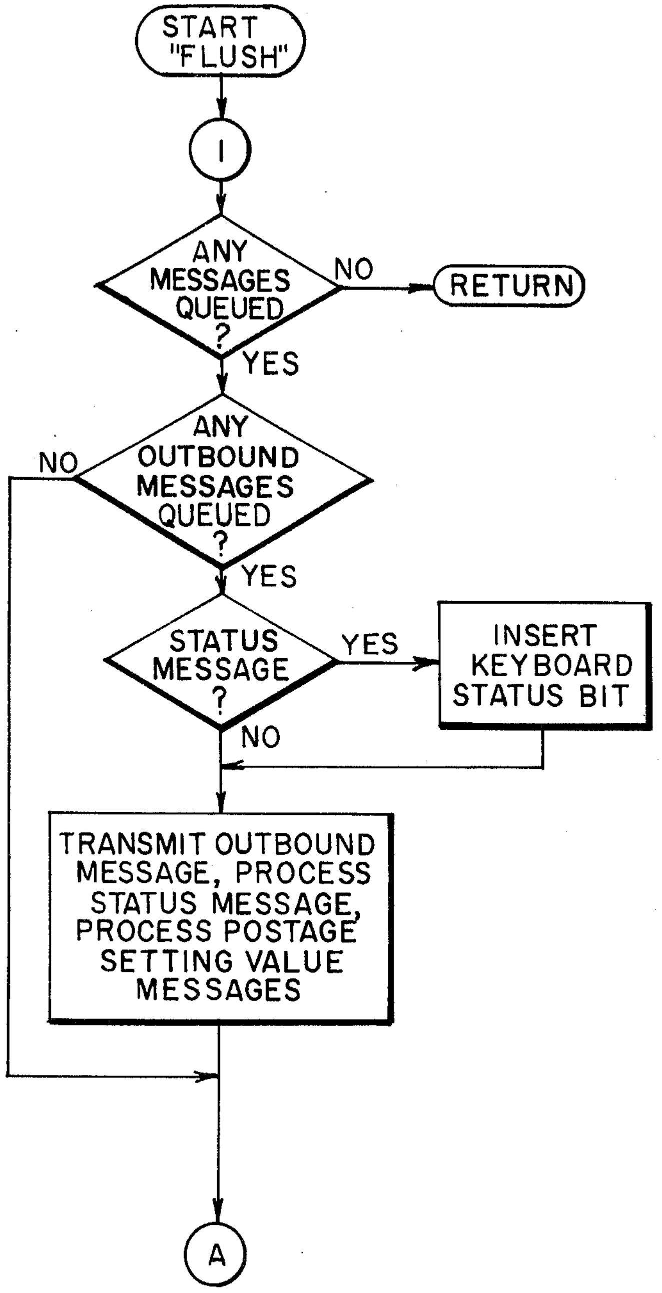
FIGS. 16*a* and 16*b* are sequential flowcharts illustrating the flush processing of the control module operation.
Figure 16B:
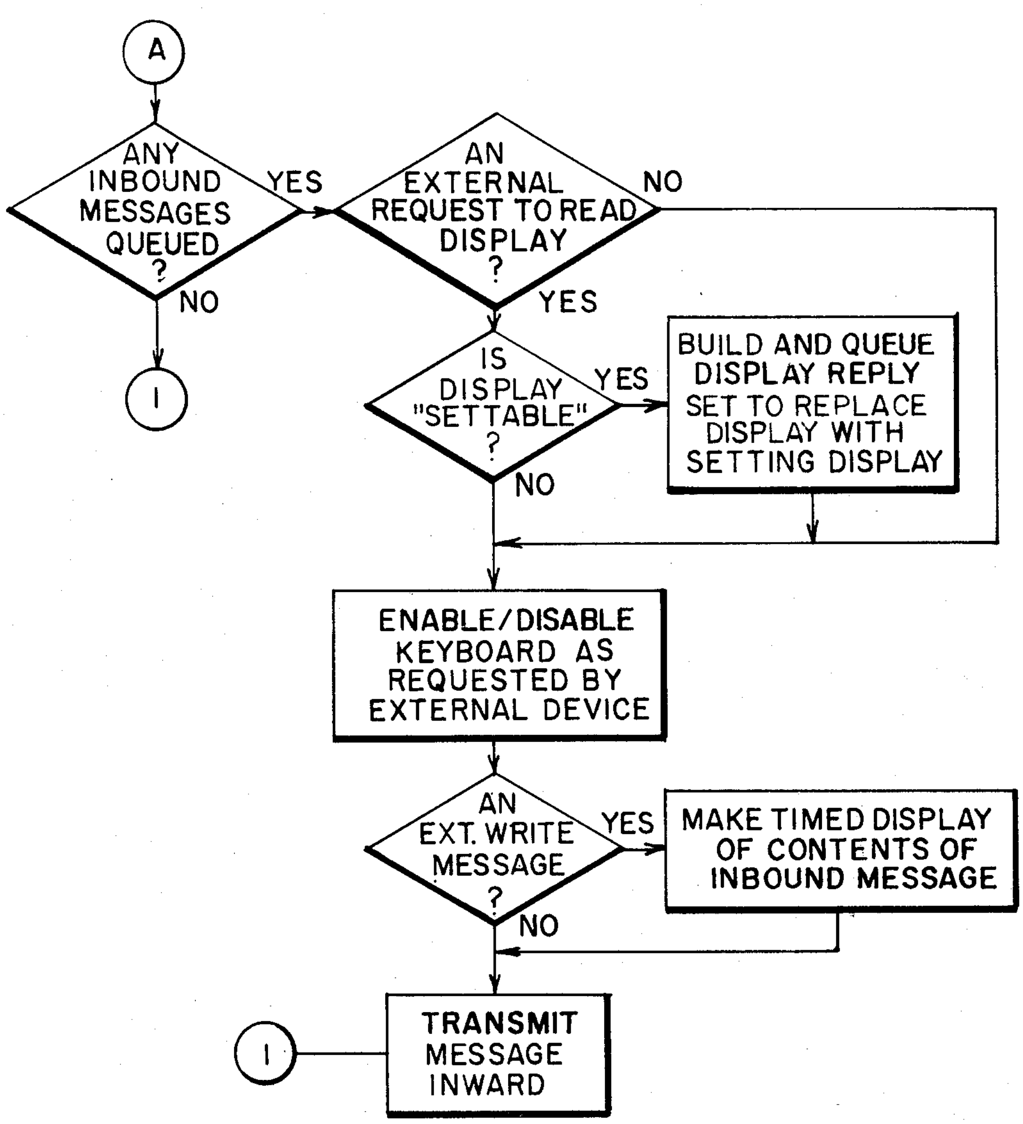
Figure 17A:
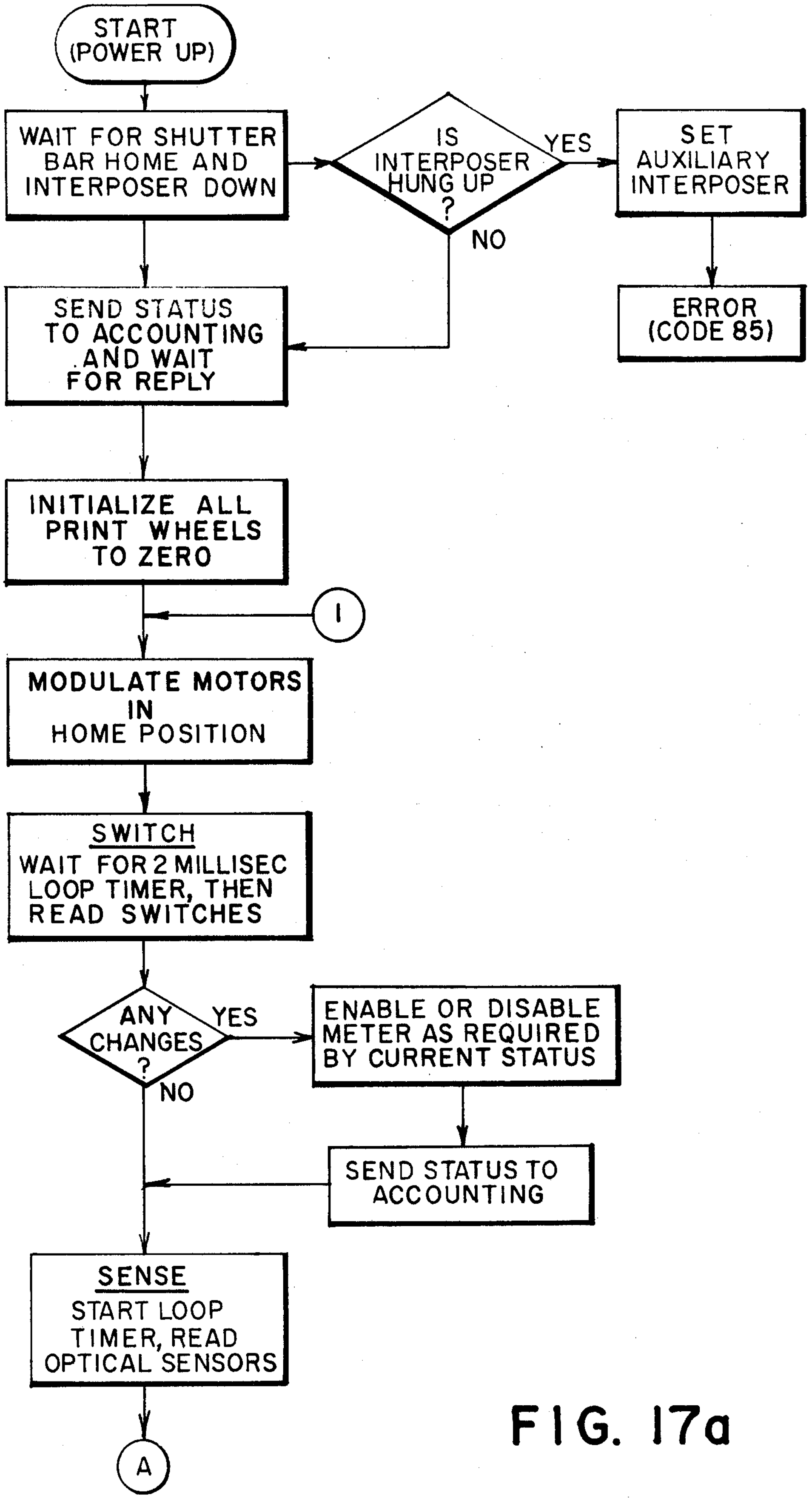
FIGS. 17*a* and 17*b* are sequential flowcharts illustrating the mainline processing of the printer module operation.
Figure 17B:
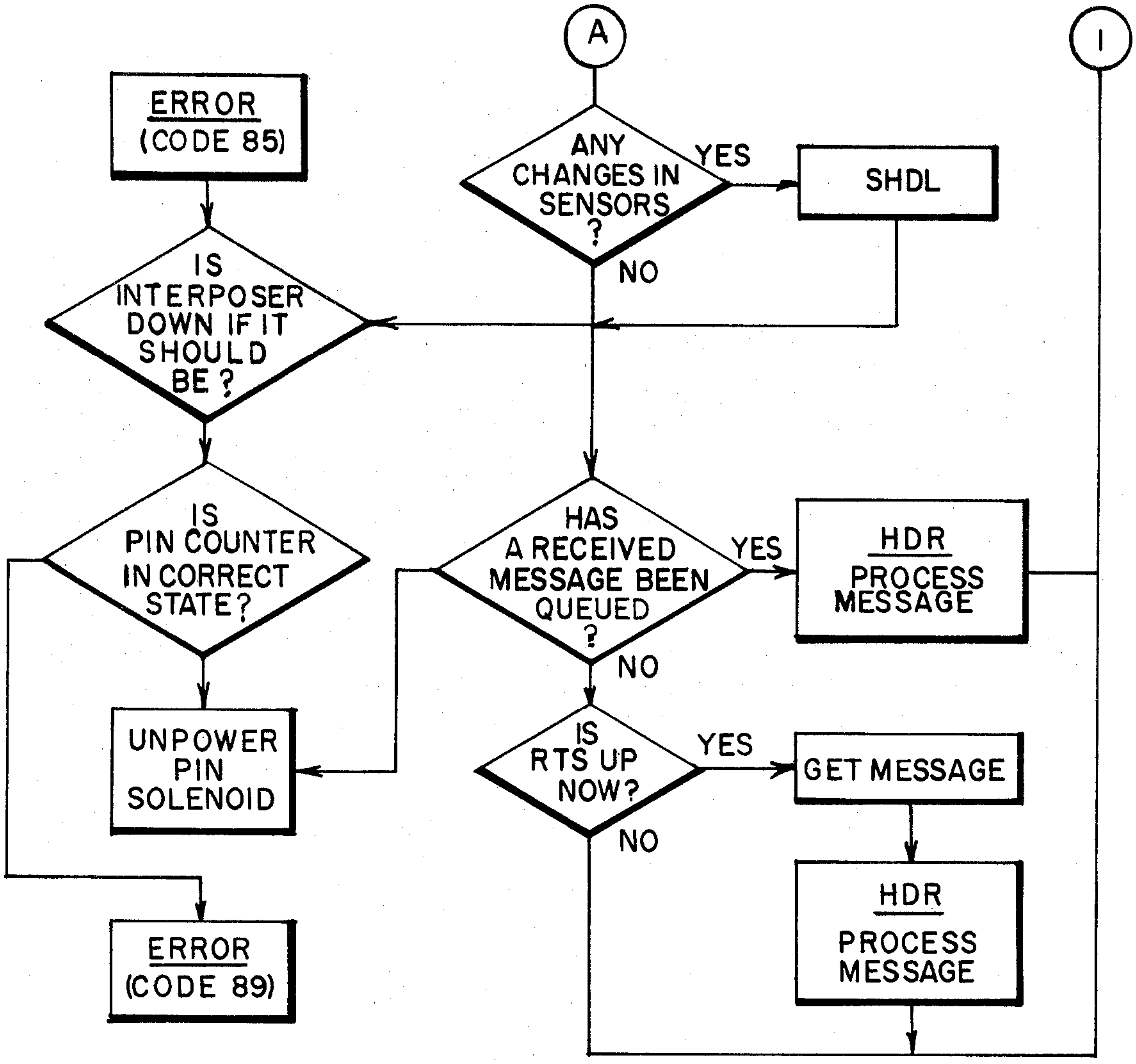
Figure 18A:
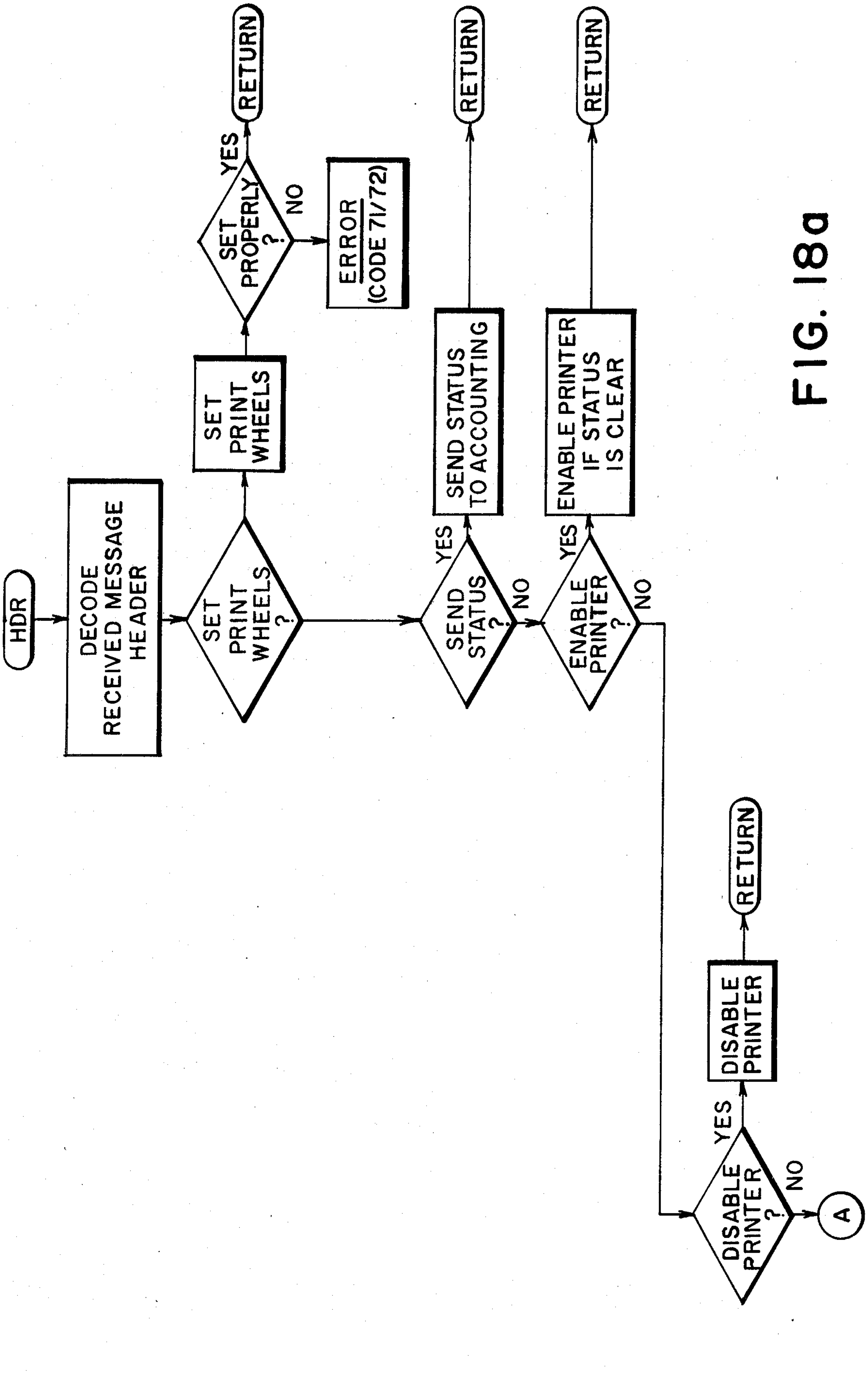
FIGS. 18*a* and 18*b* are sequential flowcharts illustrating a subroutine process for the printer module operation.
Figure 18B:
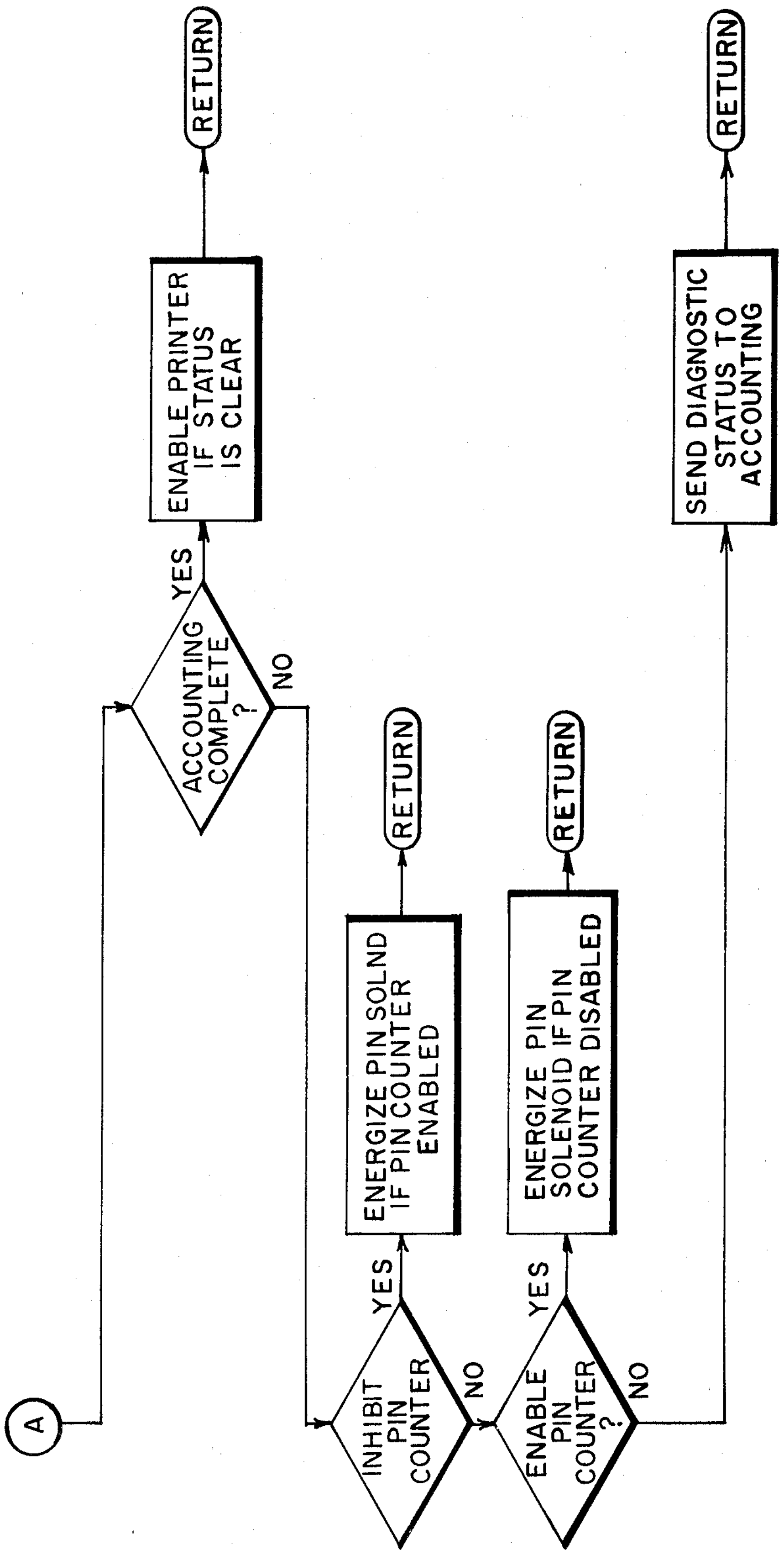
Figure 19:
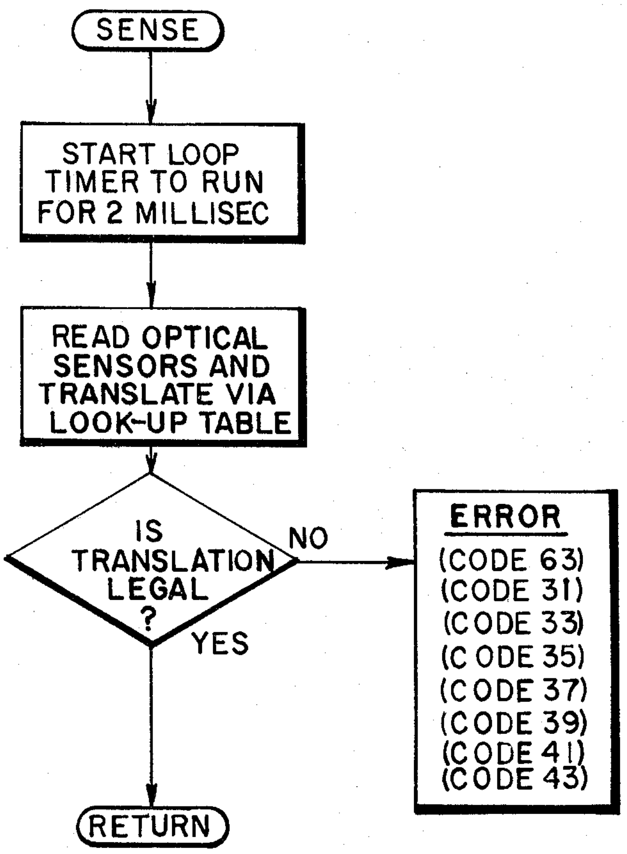
FIGS. 19–22 are flowcharts illustrating subroutines for the printer module operation.
Figure 20:
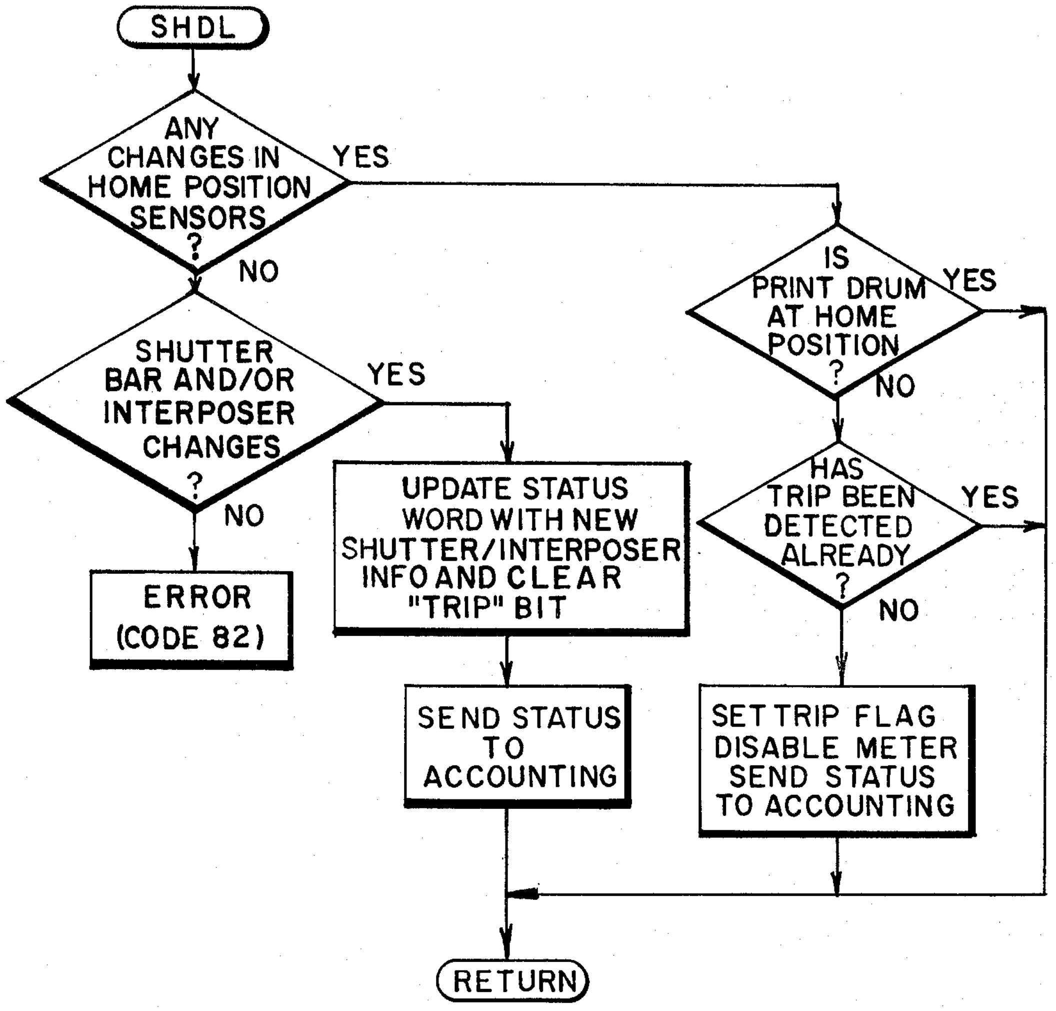
Figure 21:
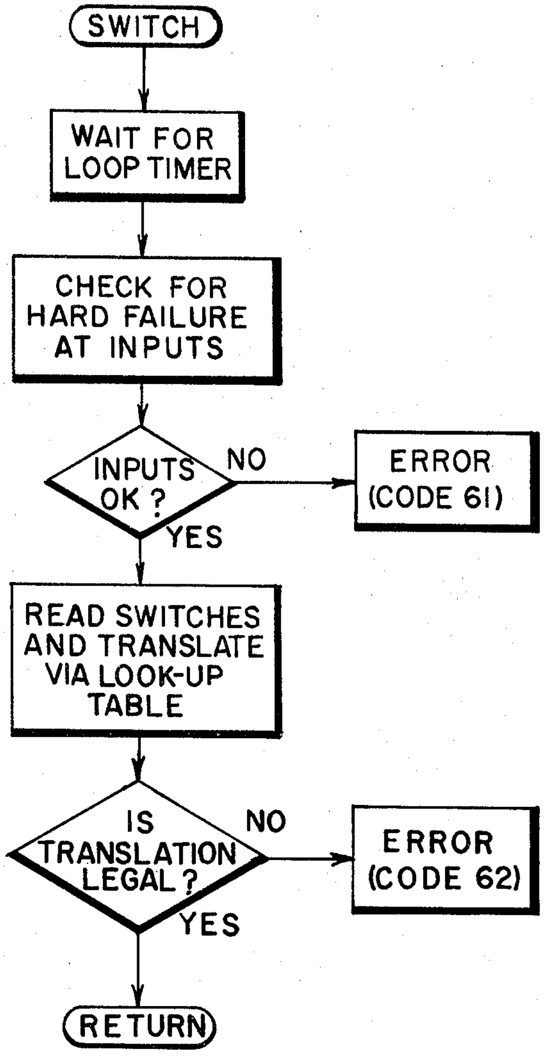
Figure 22:
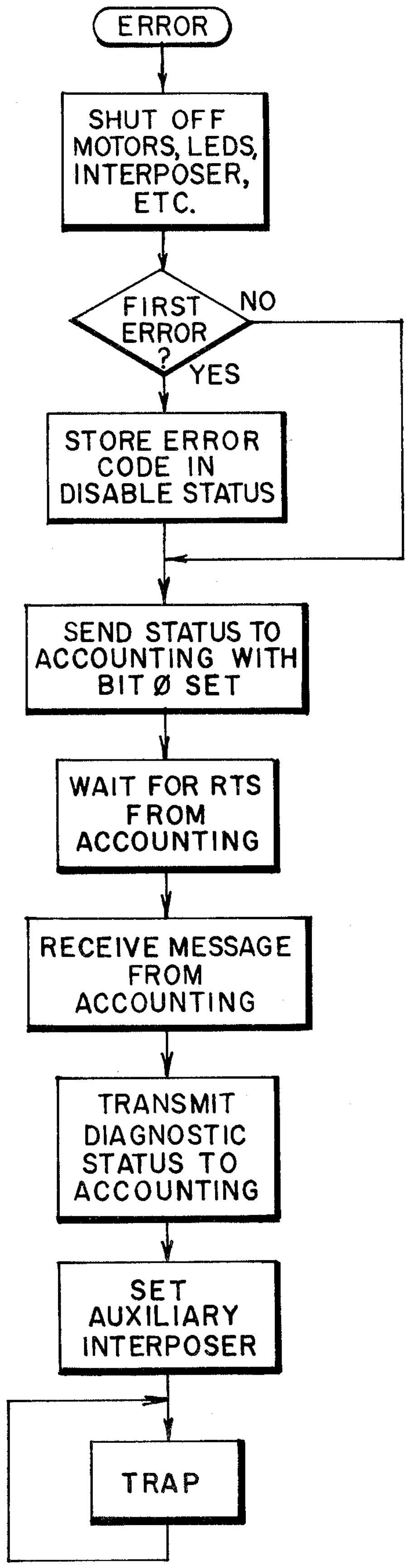
Figure 23A:
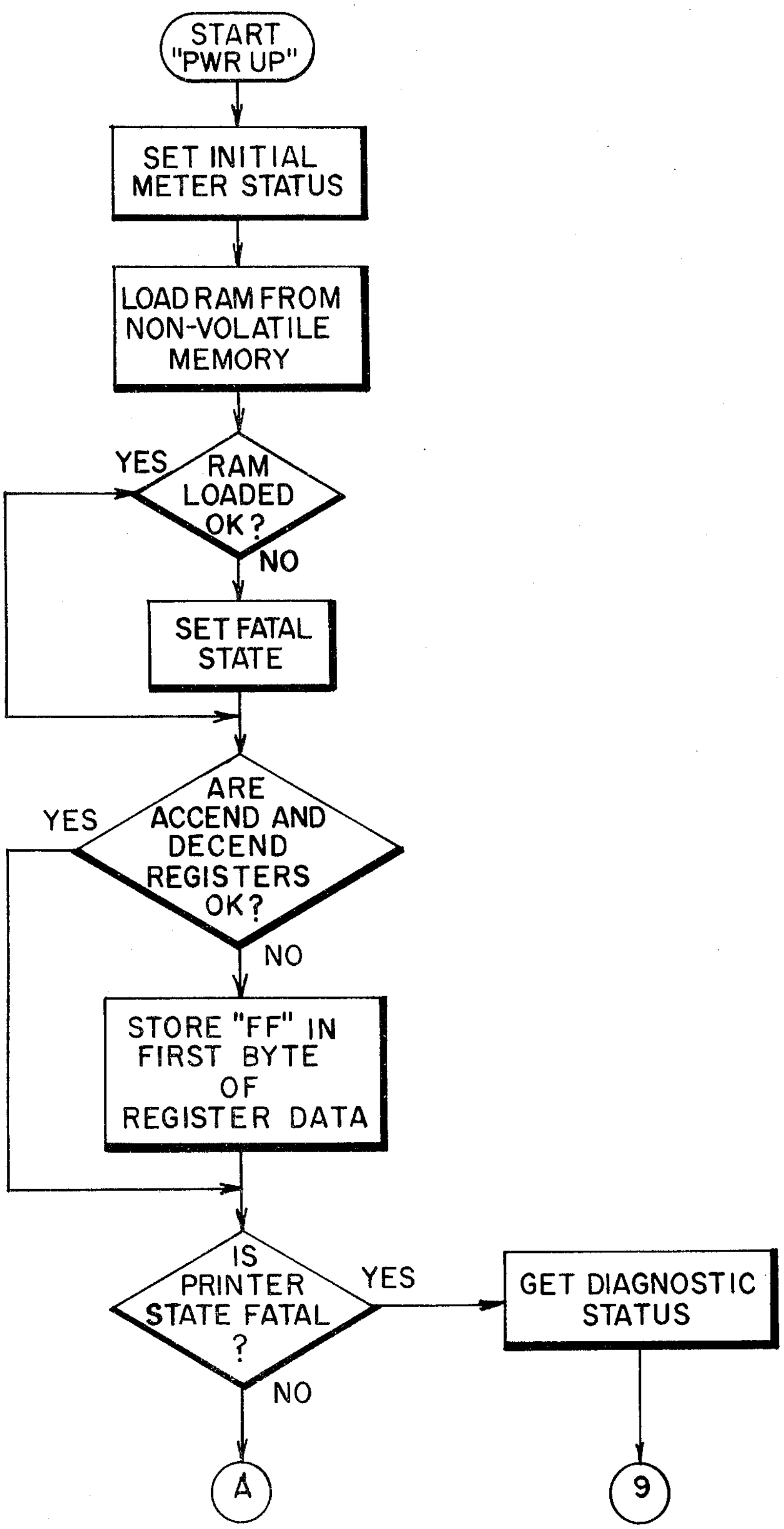
FIGS. 23*a*–23*d* are sequential flow charts illustrating the processing of the accounting module operation.
Figure 23B:
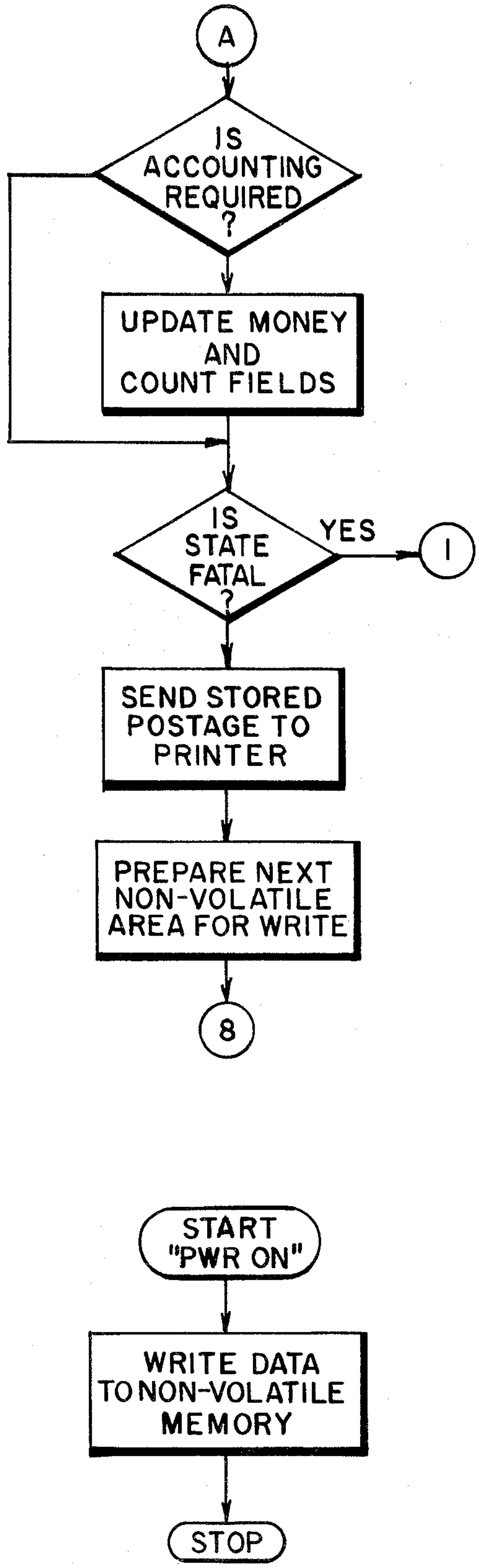
Figure 23C:
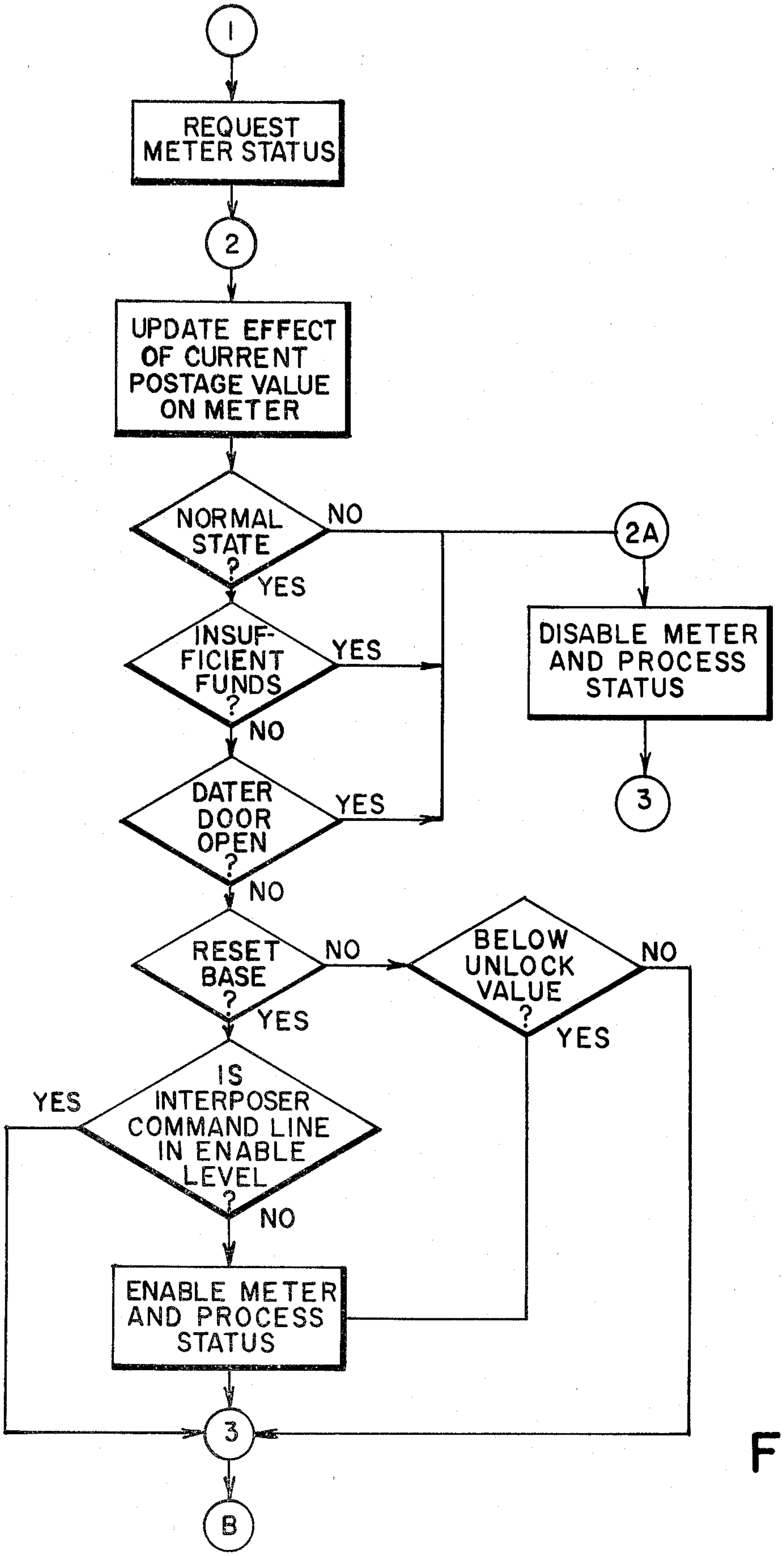
Figure 23D:
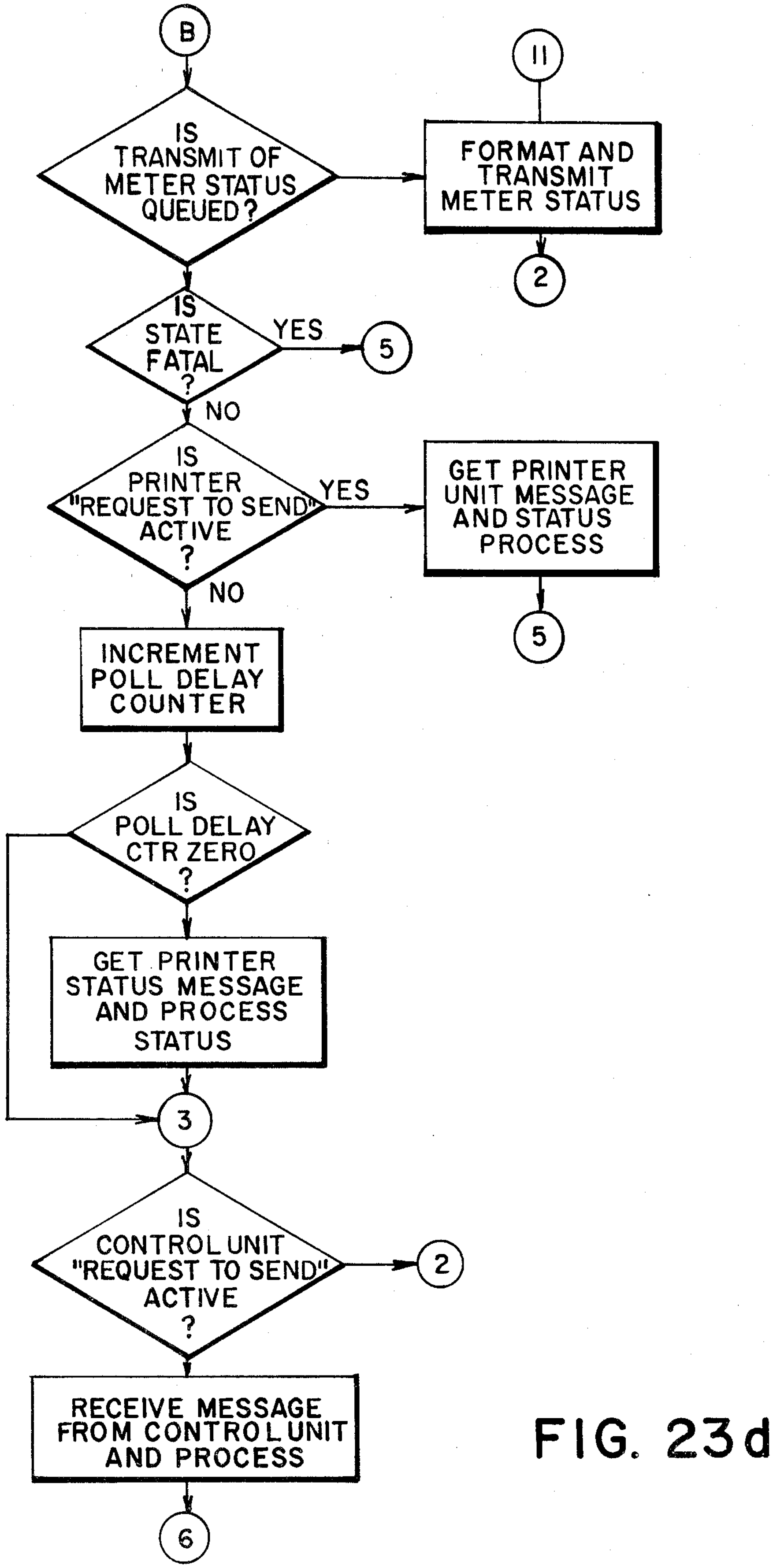
Figure 24:
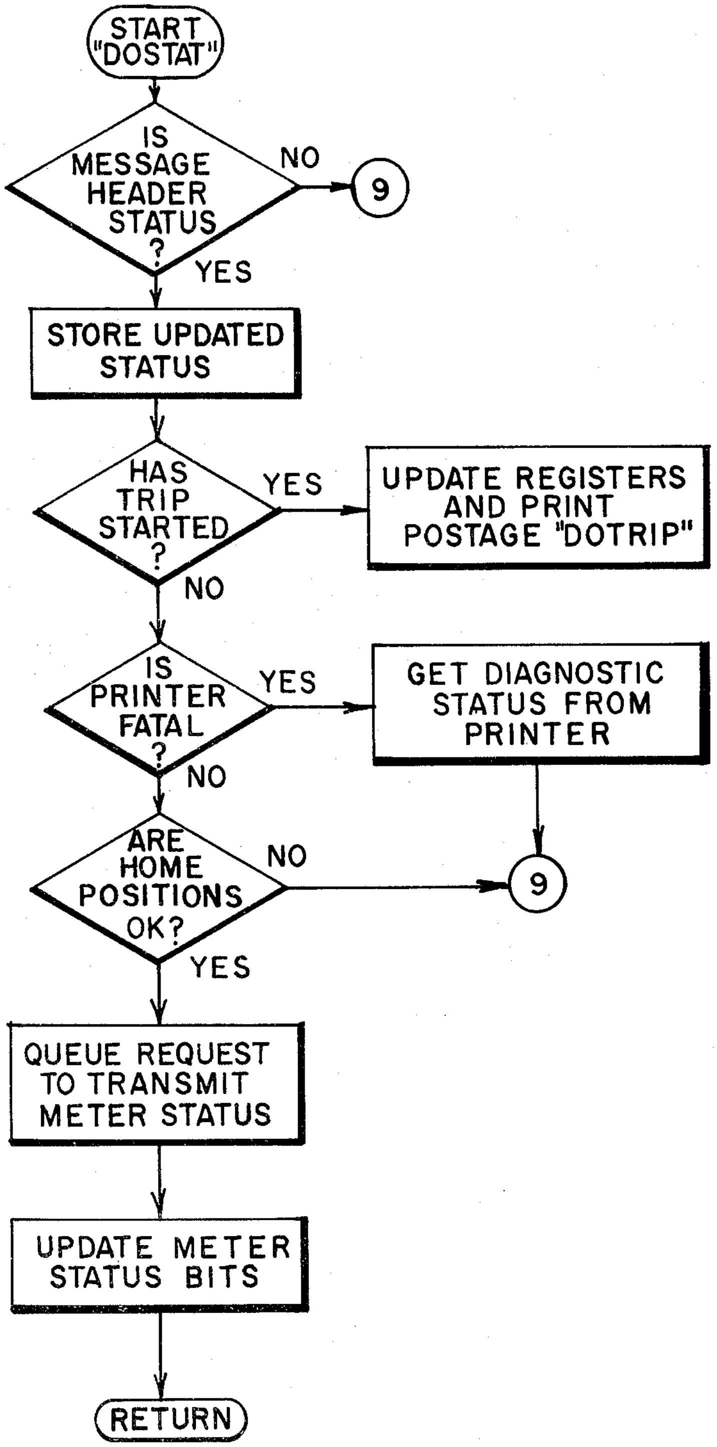
FIG. 24 is a flow chart of the status processing on the accounting module.
Figure 25:
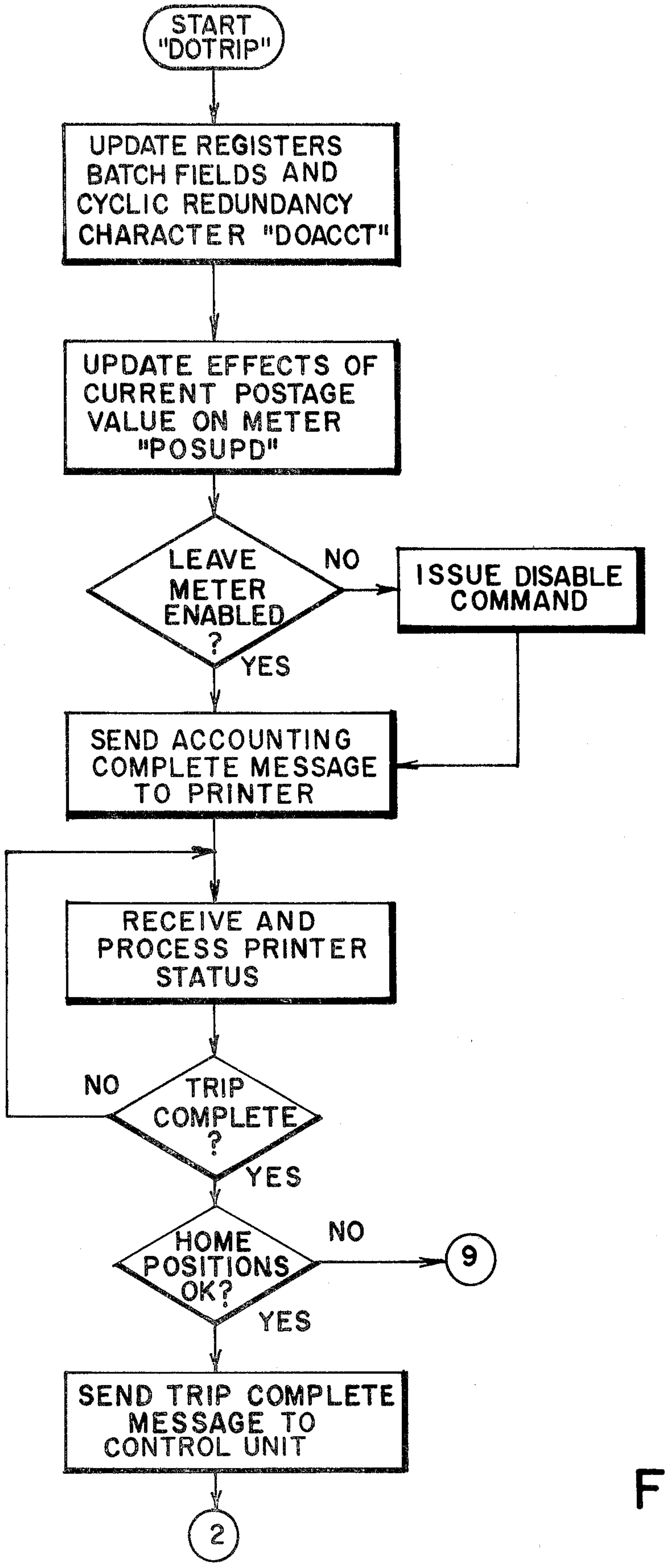
FIG. 25 is a flow chart of the trip metering of the accounting module.
Figure 26A:
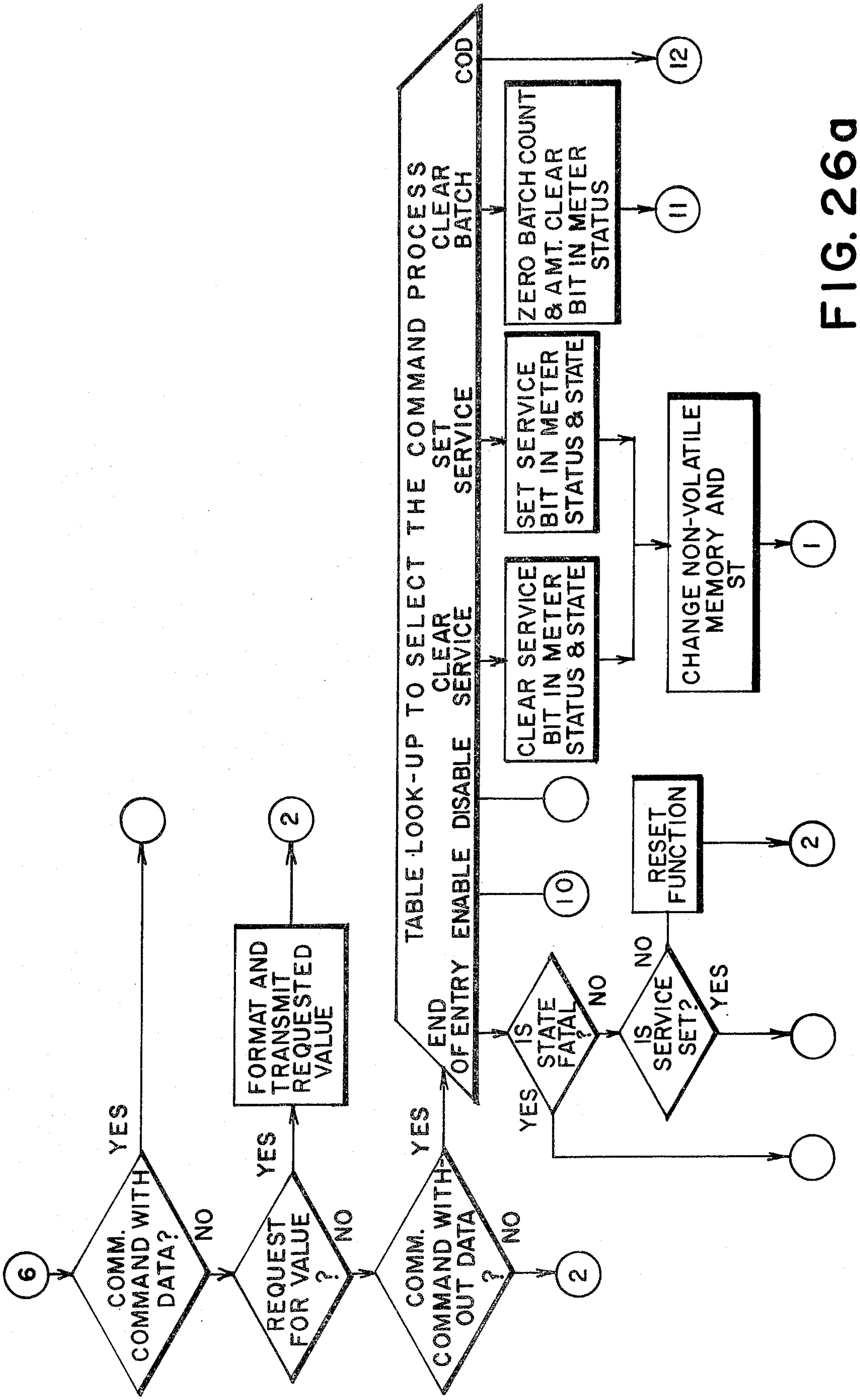
FIGS. 26*a*–26*d* are sequential flow charts of the communications processing for the accounting module.
Figure 26B:
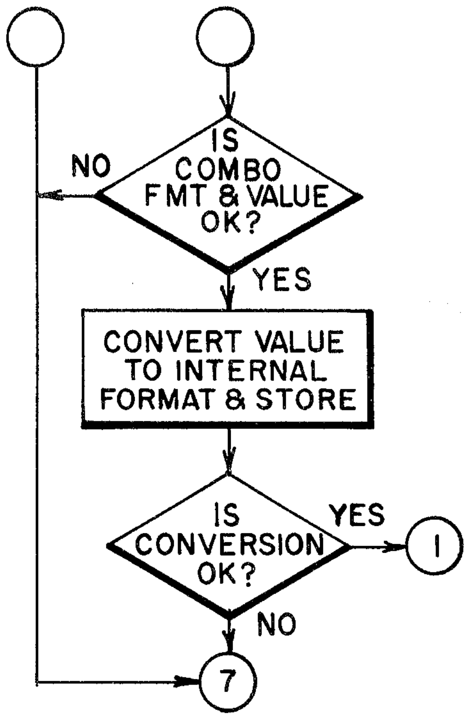
Figure 26C:
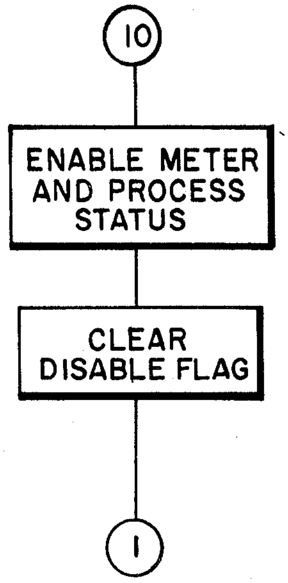
Figure 26D:
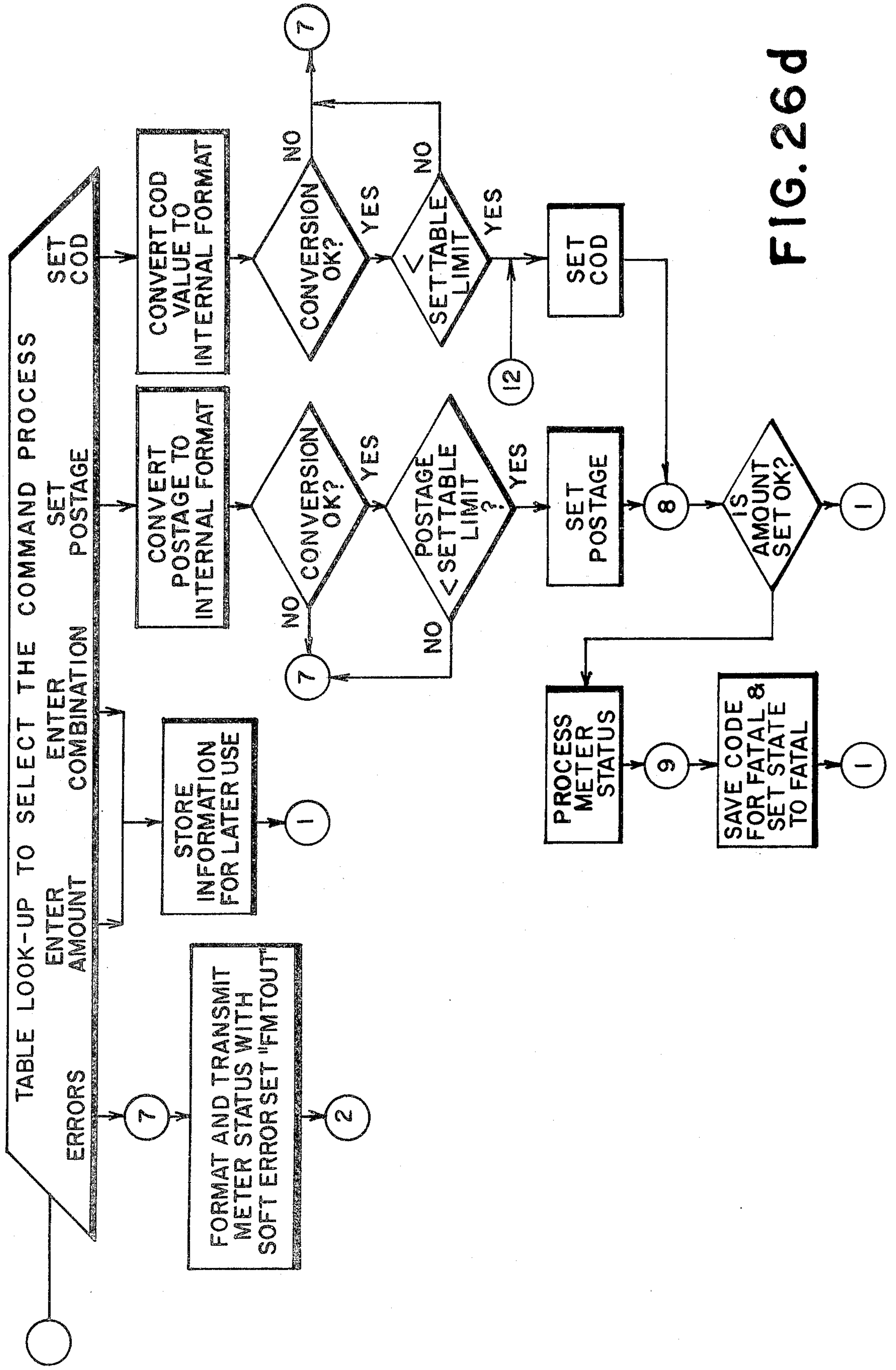

Flowcharts representing the sequence of operation of the various units are shown in FIGS. 14, 15, and 16. In each case, the unlettered figure shows the manner wherein the corresponding figure number and letter are assembled to represent a complete flowchart.

The flowchart representing the operation of the control unit is shown in the sequence of FIG. 14.

The flowchart representing the operation of the printing module 56 is shown in the sequence of FIG. 15.

The flowchart representing the operation of the accounting module 58 is shown in the sequence of FIG. 16.

The appendix A regarding the programmed function is attached hereto. The appendix is a detailed printout of each of the programs contained in the accounting module 58 control unit 75 and printing module 56.

What is claimed is:

1. A parcel register having a data entry and display keyboard, an accounting module, and a printing module, which printing module includes means for controlling a first set of print wheels that are operative to print a value upon a tape and a second set of wheels that has means for printing a series of consecutive numbers of successive tapes, comprising: a first microprocessor for controlling data entry and display of said keyboard, a second microprocessor for controlling arithmetic operations in said accounting module, and a third microprocessor for controlling the operation of said printing module in accordance with instructions from said second microprocessor, said printing module having means responsive to an input into said keyboard for selecting a first value to be printed on a first tape by said first set of print wheels and means for printing a number from sequence of numbers on said first tape by said second set of print wheels and means for selecting a second value for printing upon a second tape and for inhibiting said series sequence means of said second set of print wheels causing said second set of print wheels to print on said second tape the same number from a sequence of numbers as printed on said first tape.

2. The register of claim 1 wherein said flow of data between all three microprocessors is on a contention basis.

3. The register of claim 1 wherein each of said microprocessors transmits and receives strings of data from the other of said microprocessors, each microprocessor including means to receive data on a bit-by-bit basis and to redirect each bit as received back to its originating microprocessor means in each of said microprocessors for comparing each received bit with the corresponding transmitted bit for accuracy, and means in each of said microprocessors for indicating each valid bit compare.

4. An electronic parcel register having a data entry and display keyboard, an accounting module, and a printing module, the register being adapted to be attached to a mailing machine and having a printing head with a first set of printing wheels that may be selectively positioned to print a value on a tape and a second set of printing wheels that are incremented for printing consecutive numbers on each successive tape, comprising: a microprocessor means for controlling the data entry and display of said keyboard, for controlling arithmetic operations in said accounting module, for controlling the operation of said printing module, and for transferring data and instructions among the keyboard, the accounting module and the printing module, said printing module having means for selecting the position of the first set of wheels for printing a first tape with postage value and means for instructing the incrementing of the second set of wheels upon each printing of a tape.

5. The register of claim 4 wherein each printing module includes means for instructing the inhibiting of said second set of print wheels when a second tape is to be printed by said printing head.

6. The register of claim 5 wherein said microprocessor means includes means for receiving commands from an external source.

7. The register of claim 5 wherein said register includes a temperature sensor and means responsive to said temperature sensor to disable said register.

8. The register of claim 5 wherein said microprocessor include volatile working memories, non-volatile storage memories, and power storage means for transferring data from said volatile memories to said non-volatile memories when electrical power is terminated to said register.

9. The register of claim 5 including a noise and excess voltage sensor and means responsive to said sensor for disabling said register.

10. An electronic parcel register having a data entry and display keyboard, an accounting module, and a printing module, the register being adapted to be attached to a mailing machine and having a printing head with a set of printing wheels that may be selectively positioned to print a value of a tape, comprising: a first microprocessor for receiving data from said keyboard, a second microprocessor for controlling arithmetic operations in said accounting module, and a third microprocessor for controlling the operation of said printing module in accordance with instructions from said first microprocessor, said keyboard having first means for causing said printing module to select a variable value on said print wheels to be printed on a first tape and a second means for selecting a predetermined value on said printing wheels for printing on a second tape.

11. The register of claim 10 including means for overriding said second means and allowing a second variable value to be printed on said second tape.

12. The register of claim 11 wherein said first variable value is a postage value and said second variable value is a COD value.

13. The register of claim 11 wherein said first microcomputer includes means for receiving commands from an external source.

14. The register of claim 11 wherein said register includes a temperature sensor and means responsive to said temperature sensor to disable said register.

15. The register of claim 11 wherein said second microprocessor includes a volatile working memory, non-volatile storage memory and power storage means for transferring data from said volatile memory to said non-volatile memory upon electrical power being terminated to said register.

16. The register of claim 11 including a noise and excess voltage sensor and means responsive to said sensor for disabling said register.

17. The register of claim 10 wherein said variable value is a postage value and said pre-determined value is a COD value.

18. An electronic parcel register of the type having means for printing postage on a tape and means for accounting for postage printed by the printing means, the printing postage means having a first set of printing wheels that may be selectively positioned to print a value on the tape and a second set of printing wheels that are incrementable for printing consecutive numbers on successive tapes, the improvement comprising: microprocessor means for controlling the accounting means, for controlling the actuation of the printing means and for transferring data between the accounting means and the printing means, the printing means having means connected to said microprocessor means for selecting the position of the first set of wheels for the printing of a first tape with postage value, means for incrementing the second set of print wheels after each printing to obtain consecutive parcel identification numbers and means for selectively inhibiting the incrementing of the second set of wheels upon printing of a tape whereby the same parcel identification number may be presented upon successive tapes.

19. An electronic parcel register of the type having means for printing postage and means for accounting for postage printed by the printing means, the printing means having a first set of printing wheels that are positionable to print selected postage value and a second set of printing wheels that are incrementable for printing parcel identification numbers on each successive tape, the improvement comprising: microprocessor means for controlling the accounting means and for controlling the printing means, said printing means having means for selecting the position of the first set of wheels for printing postage value and means coupled to and controlled by said microprocessor means for selectively incrementing the second set of wheels.

* * * * *